United States Patent
Kariatsumari et al.

(10) Patent No.: US 8,892,306 B2
(45) Date of Patent: *Nov. 18, 2014

(54) MOTOR CONTROL UNIT AND VEHICLE STEERING SYSTEM

(75) Inventors: Yuji Kariatsumari, Yamatotakada (JP); Hayato Komatsu, Ama-gun (JP); Terutaka Tamaizumi, Okazaki (JP); Yoshihiro Itatsu, Okazaki (JP)

(73) Assignee: JTEKT Corporation, Osaka-shi (JP)

( * ) Notice: Subject to any disclaimer, the term of this patent is extended or adjusted under 35 U.S.C. 154(b) by 116 days.

This patent is subject to a terminal disclaimer.

(21) Appl. No.: 12/946,187

(22) Filed: Nov. 15, 2010

(65) Prior Publication Data
US 2011/0118940 A1    May 19, 2011

(30) Foreign Application Priority Data

Nov. 17, 2009 (JP) ............................. JP2009-261958
Apr. 19, 2010 (JP) ............................. JP2010-096374
Sep. 14, 2010 (JP) ............................. JP2010-205920

(51) Int. Cl.
| | |
|---|---|
| B62D 5/04 | (2006.01) |
| B62D 5/14 | (2006.01) |
| H02P 21/04 | (2006.01) |
| H02P 21/00 | (2006.01) |

(52) U.S. Cl.
CPC ............ *H02P 21/0046* (2013.01); *H02P 21/04* (2013.01); *B62D 5/046* (2013.01)
USPC .............................................. 701/41; 701/42

(58) Field of Classification Search
CPC ....................................................... B62D 5/046
USPC .............................. 701/41–42; 180/443–447
See application file for complete search history.

(56) References Cited

U.S. PATENT DOCUMENTS 5,513,720 A * 5/1996 Yamamoto et al. ............ 180/421
5,568,389 A   10/1996 McLaughlin et al.
(Continued)

FOREIGN PATENT DOCUMENTS

EP    1 487 098 A1    12/2004
EP    1 955 926 A2     8/2008
(Continued)

OTHER PUBLICATIONS

U.S. Appl. No. 12/823,573, filed Jun. 25, 2010.
(Continued)

*Primary Examiner* — Helal A Algahaim
*Assistant Examiner* — Charles J Han
(74) *Attorney, Agent, or Firm* — Oliff PLC

(57) ABSTRACT

A motor is driven by the γ-axis current of a γδ coordinate system that is an imaginary rotating coordinate system. A command current value preparation unit sets the γ-axis command current value based on the command steering torque and the detected steering torque. The command current value preparation unit includes a command current increase/decrease amount calculation unit and an addition unit. The command current increase/decrease amount calculation unit calculates the current increase/decrease amount for the command current value based on the sign of the command steering torque and the deviation of the detected steering torque from the command steering torque. The current increase/decrease amount calculated by the command current increase/decrease amount calculation unit is added to the immediately preceding value of the command current value by the addition unit. Thus, the command current value in the present calculation cycle is calculated.

6 Claims, 16 Drawing Sheets

(56) References Cited

U.S. PATENT DOCUMENTS

| | | | |
|---|---|---|---|
| 5,928,298 | A | 7/1999 | Matsuoka et al. |
| 6,364,051 | B1 * | 4/2002 | Kada et al. ............ 180/446 |
| 6,396,229 | B1 | 5/2002 | Sakamoto et al. |
| 6,397,969 | B1 | 6/2002 | Kasai et al. |
| 6,781,333 | B2 | 8/2004 | Koide et al. |
| 7,076,340 | B1 | 7/2006 | Inazumi et al. |
| 2002/0026270 | A1 | 2/2002 | Kurishige et al. |
| 2002/0180402 | A1 * | 12/2002 | Koide et al. ............ 318/727 |
| 2003/0030404 | A1 | 2/2003 | Iwaji et al. |
| 2004/0267421 | A1 | 12/2004 | Eskritt et al. |
| 2005/0029972 | A1 | 2/2005 | Imai et al. |
| 2005/0257994 | A1 | 11/2005 | Fujita |
| 2005/0273236 | A1 | 12/2005 | Mori et al. |
| 2006/0086561 | A1 * | 4/2006 | Hidaka ............ 180/446 |
| 2006/0090954 | A1 | 5/2006 | Sugitani et al. |
| 2006/0125439 | A1 | 6/2006 | Ajima et al. |
| 2007/0040528 | A1 | 2/2007 | Tomigashi et al. |
| 2007/0229021 | A1 | 10/2007 | Yoshia et al. |
| 2007/0273317 | A1 | 11/2007 | Endo et al. |
| 2007/0284181 | A1 | 12/2007 | Muranaka |
| 2008/0035411 | A1 | 2/2008 | Yamashita et al. |
| 2008/0047775 | A1 * | 2/2008 | Yamazaki ............ 180/443 |
| 2008/0128197 | A1 | 6/2008 | Kawaguchi et al. |
| 2008/0201041 | A1 * | 8/2008 | Jiang ............ 701/42 |
| 2009/0069979 | A1 | 3/2009 | Yamashita et al. |
| 2009/0240389 | A1 | 9/2009 | Nomura et al. |
| 2010/0057300 | A1 | 3/2010 | Nishiyama |
| 2010/0094505 | A1 | 4/2010 | Kariatsumari et al. |
| 2010/0198462 | A1 | 8/2010 | Shinoda et al. |
| 2010/0263709 | A1 | 10/2010 | Norman et al. |
| 2011/0035114 | A1 | 2/2011 | Yoneda et al. |
| 2012/0080259 | A1 | 4/2012 | Ueda et al. |

FOREIGN PATENT DOCUMENTS

| | | |
|---|---|---|
| EP | 2 086 106 A2 | 8/2009 |
| EP | 2 159 133 A1 | 3/2010 |
| EP | 2 177 422 A2 | 4/2010 |
| EP | 2 216 895 A2 | 8/2010 |
| JP | A 4-161085 | 6/1992 |
| JP | A 6-305436 | 11/1994 |
| JP | A 9-226606 | 9/1997 |
| JP | A 10-76960 | 3/1998 |
| JP | A-10-243699 | 9/1998 |
| JP | A 10-243699 | 9/1998 |
| JP | A 2000-050689 | 2/2000 |
| JP | A 2001-37281 | 2/2001 |
| JP | A 2001-251889 | 9/2001 |
| JP | A 2002-359996 | 12/2002 |
| JP | A 2003-125594 | 4/2003 |
| JP | A 2003-182620 | 7/2003 |
| JP | A 2007-53829 | 3/2007 |
| JP | A 2007-267549 | 10/2007 |
| JP | A 2008-24196 | 2/2008 |
| JP | A 2008-087756 | 4/2008 |
| JP | A-2009-124811 | 6/2009 |
| JP | A 2009-124811 | 6/2009 |
| JP | A 2010-178549 | 8/2010 |
| WO | WO 2007/139030 A1 | 12/2007 |
| WO | WO 2009/138830 A1 | 11/2009 |

OTHER PUBLICATIONS

U.S. Appl. No. 13/685,152, filed Nov. 26, 2012.
U.S. Appl. No. 12/696,604, filed Jan. 29, 2010.
U.S. Appl. No. 12/945,101, filed Nov. 12, 2010.
U.S. Appl. No. 12/943,514, filed Nov. 10, 2010.
U.S. Appl. No. 13/205,138, filed Aug. 8, 2011.
U.S. Appl. No. 12/997,168, filed Dec. 9, 2010.
Feb. 6, 2014 Office Action issued in U.S. Appl. No. 12/823,573.
Sep. 5, 2013 Office Action issued in U.S. Appl. No. 12/823,573.
Mar. 21, 2013 Office Action issued in U.S. Appl. No. 12/823,573.
Dec. 10, 2012 Office Action issued in U.S. Appl. No. 12/823,573.
Jun. 19, 2012 Office Action issued in U.S. Appl. No. 12/823,573.
Nov. 7, 2013 Office Action issued in U.S. Appl. No. 13/685,152.
Jul. 17, 2013 Office Action issued in U.S. Appl. No. 13/685,152.
Jul. 20, 2010 Search Report issued in European Patent Application No. 10156226.
May 24, 2012 Office Action issued in U.S. Appl. No. 12/721,855.
Feb. 6, 2014 Office Action issued in U.S. Appl. No. 12/696,604.
Jul. 15, 2013 Office Action issued in U.S. Appl. No. 12/696,604.
Mar. 25, 2013 Office Action issued in U.S. Appl. No. 12/696,604.
Nov. 29, 2012 Office Action issued in U.S. Appl. No. 12/696,604.
Jun. 12, 2012 Office Action issued in U.S. Appl. No. 12/696,604.
Feb. 12, 2014 Office Action issued in U.S. Appl. No. 12/945,101.
Nov. 28, 2013 Office Action issued in Japanese Patent Application No. 2009-258962 (with translation).
Jul. 19, 2013 Office Action issued in U.S. Appl. No. 12/945,101.
Mar. 26, 2013 Office Action issued in U.S. Appl. No. 12/945,101.
Dec. 11, 2012 Office Action issued in U.S. Appl. No. 12/945,101.
Aug. 9, 2012 Office Action issued in U.S. Appl. No. 12/945,101.
Aug. 31, 2012 Office Action issued in U.S. Appl. No. 12/943,514.
Mar. 22, 2013 Office Action issued in U.S. Appl. No. 12/943,514.
Sep. 10, 2013 Office Action issued in U.S. Appl. No. 12/943,514.
Feb. 10, 2014 Office Action issued in U.S. Appl. No. 12/943,514.
Feb. 11, 2014 Office Action issued in U.S. Appl. No. 13/205,138.
Sep. 5, 2013 Office Action issued in U.S. Appl. No. 13/205,138.
Mar. 20, 2013 Office Action issued in U.S. Appl. No. 13/205,138.
Sep. 19, 2012 Search Report issued in European Patent Application No. 11177780.1.
Sep. 10, 2012 Office Action issued in U.S. Appl. No. 13/205,138.
Feb. 6, 2014 Office Action issued in U.S. Appl. No. 12/997,168.
Sep. 10, 2013 Office Action issued in U.S. Appl. No. 12/997,168.
Mar. 25, 2013 Office Action issued in U.S. Appl. No. 12/997,168.
Aug. 14, 2012 Office Action issued in U.S. Appl. No. 12/997,168.
Feb. 8, 2011 International Preliminary Report on Patentability issued in International Patent Application No. PCT/JP2009/002991 (with translation).
Oct. 6, 2009 Search Report issued in International Patent Application No. PCT/JP2009/002991 (with translation).
May 22, 2014 Office Action issued in Japanese Patent Application No. 2010-186220 (with translation).
Extended European Search Report issued in European Patent Application No. 10191142.8 dated Jun. 8, 2011.

* cited by examiner

MOTOR CONTROL UNIT AND VEHICLE STEERING SYSTEM

INCORPORATION BY REFERENCE

The disclosure of Japanese Patent Applications No. 2009-261958 filed on Nov. 17, 2009, No. 2010-096374 filed on Apr. 19, 2010, and No. 2010-205920 filed on Sep. 14, 2010, each including the specification, drawings and abstract is incorporated herein by reference in its entirety.

BACKGROUND OF THE INVENTION

1. Field of the Invention

The invention relates to a motor control unit used to drive a brushless motor, and a vehicle steering system, for example, an electric power steering system, which includes the motor control unit.

2. Description of the Related Art

A motor control unit that controls driving of a brushless motor is usually configured to control the electric current that is supplied to a motor based on the output from a rotational angle sensor that detects the rotational angle of a rotor. As a rotational angle sensor, a resolver that outputs a sine-wave signal and a cosine-wave signal that correspond to the rotational angle (electrical angle) of a rotor is usually used. However, a resolver is expensive, and needs a large number of wires and a large installation space. Therefore, using a resolver as a rotational angle sensor hinders reduction in cost and size of a unit that includes a brushless motor.

To address this problem, a sensorless drive method for driving a brushless motor without using a rotational angle sensor has been proposed. According to the sensorless drive method, the induced voltage that is caused due to the rotation of a rotor is estimated in order to estimate the phase of a magnetic pole (electrical angle of the rotor). When the rotor is at a standstill or rotating at a considerably low speed, it is not possible to estimate the phase of the magnetic pole. Therefore, the phase of the magnetic pole is estimated by another method. More specifically, a sensing signal is input in a stator, and a response of the motor to the sensing signal is detected. Then, the rotational position of the rotor is estimated based on the response of the motor.

For example, Japanese Patent Application Publication No. 10-243699 (JP-A-10-243699) and Japanese Patent Application Publication No. 2009-124811 (JP-A-2009-124811) describe the related art.

According to the sensorless drive method described above, the rotational position of the rotor is estimated based on the induced voltage or the sensing signal, and the motor is controlled based on the estimated rotational position. However, this drive method is not suitable for all uses. There has not been established a method suitable for a control of a brushless motor that is used as a drive source for, for example, a vehicle steering system such as an electric power steering system that supplies a steering assist force to a vehicle steering mechanism. Accordingly, a sensorless control executed by another method has been demanded.

SUMMARY OF INVENTION

The invention provides a motor control unit that controls a motor according to a new control method that does not require a rotational angle sensor, and a vehicle steering system that includes the motor control unit.

A first aspect of the invention relates to a motor control unit that controls a motor that includes a rotor and a stator that faces the rotor. The motor control unit includes a current drive unit, a control angle calculation unit, a torque detection unit, a command torque setting unit, an addition angle calculation unit, and a command current setting unit. The current drive unit drives the motor based on an axis current value of a rotating coordinate system that rotates in accordance with a control angle that is a rotational angle used in a control. The control angle calculation unit obtains a present value of the control angle by adding an addition angle to an immediately preceding value of the control angle in predetermined calculation cycles. The torque detection unit detects a torque other than a motor torque, which is applied to a drive target that is driven by the motor. The command torque setting unit sets a command torque that is a torque that is other than the motor torque and that is to be applied to the drive target. The addition angle calculation unit calculates the addition angle based on a torque deviation that is a deviation of a detected torque that is detected by the torque detection unit from the command torque that is set by the command torque setting unit. The command current setting unit sets a command current value that is a target value of the axis current value based on the torque deviation. The command current setting unit sets a present value of a command current by correcting an immediately preceding value of the command current by a correction amount that corresponds to the torque deviation.

BRIEF DESCRIPTION OF DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
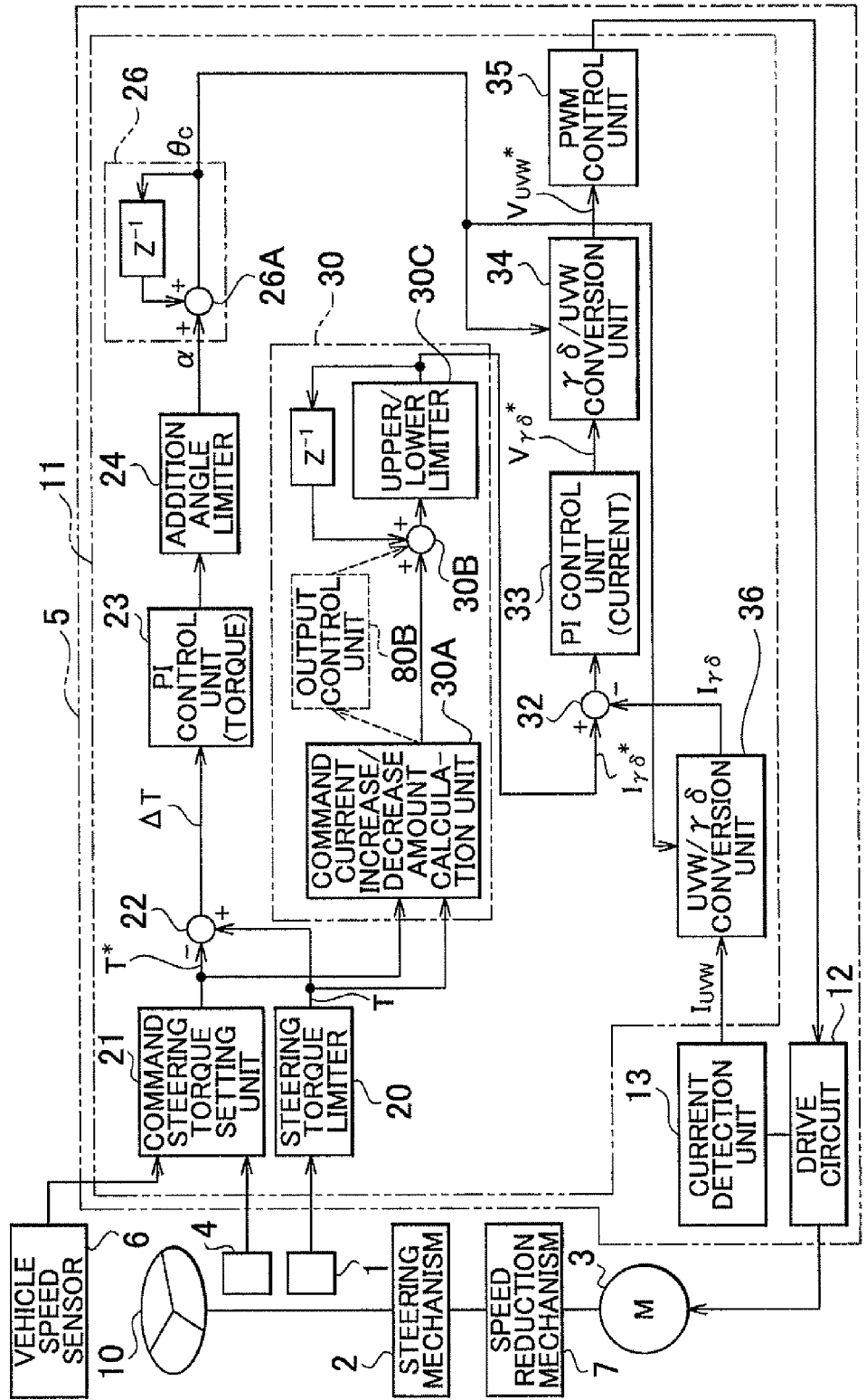
FIG. 1 is a block diagram for describing the electrical configuration of an electric power steering system to which a motor control unit according to a first embodiment of the invention is applied.

Hereafter, example embodiments of the invention will be described in detail with reference to the accompanying drawings. FIG. 1 is a block diagram for describing the electrical configuration of an electric power steering system (an example of a vehicle steering system) to which a motor control unit according to a first embodiment of the invention is applied. The electric power steering system includes a torque sensor 1, a motor 3 (brushless motor), a steering angle sensor 4, a motor control unit 5, and a vehicle speed sensor 6. The torque sensor 1 detects the steering torque T that is applied to a steering wheel 10 that serves as an operation member used to steer a vehicle. The motor 3 (brushless motor) applies a steering assist force to a steering mechanism 2 of the vehicle via a speed reduction mechanism 7. The steering angle sensor 4 detects the steering angle that is the rotational angle of the steering wheel 10. The motor control unit 5 controls driving of the motor 3. The vehicle speed sensor 6 detects the speed of the vehicle in which the electric power steering system is mounted. The steering angle sensor 4 detects the amount of rotation (rotational angle) of the steering wheel 10 from the neutral position (reference position) of the steering wheel 10 in the clockwise direction, and the amount of rotation of the steering wheel 10 from the neutral position in the counterclockwise direction. The steering angle sensor 4 outputs, as a positive value, the amount of rotation of the steering wheel 10 from the neutral position in the clockwise direction. The steering angle sensor 4 outputs, as a negative value, the amount of rotation of the steering wheel 10 from the neutral position in the counterclockwise direction.

Figure 2:
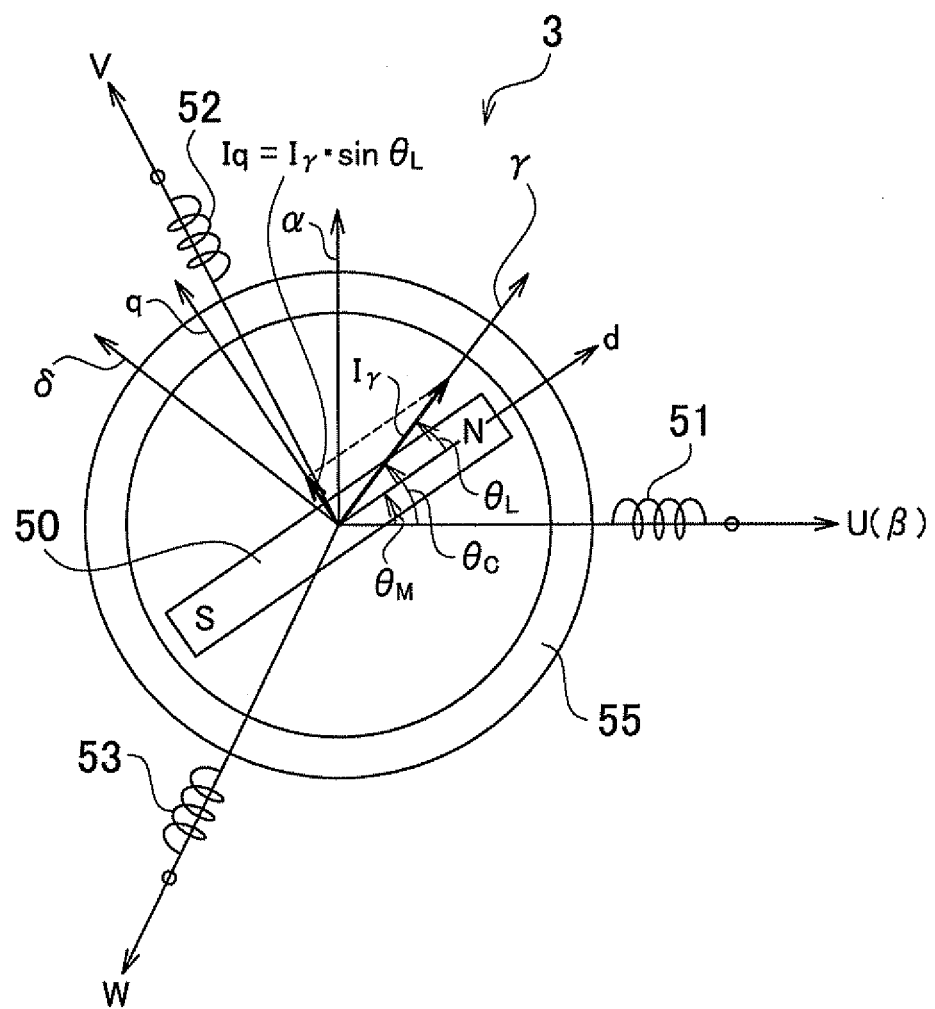
FIG. 2 is a view for describing the configuration of a motor.

The motor control unit 5 drives the motor 3 based on the steering torque detected by the torque sensor 1, the steering angle detected by the steering angle sensor 4, and the vehicle speed detected by the vehicle speed sensor 6, thereby providing appropriate steering assistance based on the steering state and the vehicle speed. In the first embodiment, the motor 3 is a three-phase brushless motor. As illustrated in FIG. 2, the motor 3 includes a rotor 50 that serves as a field magnet, and a U-phase stator coil 51, a V-phase stator coil 52, and a W-phase stator coil 53 that are arranged on a stator 55 that faces the rotor 50. The motor 3 may be an inner rotor motor in which a stator is arranged on the outer side of a rotor so as to face the rotor, or an outer rotor motor in which a stator is arranged on the inner side of a tubular rotor so as to face the rotor.

A three-phase fixed coordinate system (UVW coordinate system), where the direction in which the U-phase stator coil 51 extends, the direction in which the V-phase coil 52 extends, and the direction in which the W-phase coil 53 extends are used as the U-axis, the V-axis and W-axis, respectively, is defined. In addition, a two-phase rotating coordinate system (dq coordinate system: actual rotating coordinate system), where the direction of the magnetic poles of the rotor 50 is used as the d-axis (axis of the magnetic poles) and the direction that is perpendicular to the d-axis within the rotary plane of the rotor 50 is used as the q-axis (torque axis), is defined. The dq coordinate system is a rotating coordinate system that rotates together with the rotor 50. In the dq coordinate system, only the q-axis current contributes to generation of torque by the rotor 50. Therefore, the d-axis current may be set to 0 and the q-axis current may be controlled based on a desired torque. The rotational angle (rotor angle) $\theta_M$ of the rotor 50 is a rotational angle of the d-axis with respect to the U-axis. The dq coordinate system is an actual rotating coordinate system that rotates in accordance with the rotor angle $\theta_M$. With the use of the rotor angle $\theta_M$, coordinate conversion may be made between the UVW coordinate system and the dq coordinate system.

In the first embodiment, the control angle $\theta_C$ that indicates the rotational angle used in the control is employed. The control angle $\theta_C$ is an imaginary rotational angle with respect to the U-axis. An imaginary two-phase rotating coordinate system (γδ coordinate system: hereafter, referred to as "imaginary rotating coordinate system"), where the imaginary axis that forms the control angle $\theta_C$ with the U-axis is used as the γ-axis, and the axis that is advanced 90 degrees from the γ-axis is used as the δ-axis, is defined. When the control angle $\theta_C$ is equal to the rotor angle $\theta_M$, the γδ coordinate system, which is the imaginary rotating coordinate system, and the dq coordinate system, which is the actual rotating coordinate system, coincide with each other. That is, the γ-axis, which is the imaginary axis, coincides with the d-axis, which is the actual axis, and the δ-axis, which is the imaginary axis, coincides with the q-axis, which is the actual axis. The γδ coordinate system is an imaginary rotating coordinate system that rotates in accordance with the control angle $\theta_C$. Coordinate conversion may be made between the UVW coordinate system and the γδ coordinate system with the use of the control angle $\theta_C$.

The load angle $\theta_L$ ($=\theta_C-\theta_M$) is defined based on the difference between the control angle $\theta_C$ and the rotor angle $\theta_M$. When the γ-axis current $I_\gamma$ is supplied to the motor 3 based on the control angle $\theta_C$, the q-axis component of the γ-axis current $I_\gamma$ (orthogonal projection to the q-axis) is used as the q-axis current $I_q$ that contributes to generation of torque by the rotor 50. That is, the relationship expressed by Equation 1 is established between the γ-axis current $I_\gamma$ and the q-axis current $I_q$.

$$I_q = I_\gamma \times \sin\theta_L \qquad \text{Equation 1}$$

Referring again to FIG. 1, the motor control unit 5 includes a microcomputer 11, a drive circuit (inverter circuit) 12 that is controlled by the microcomputer 11 and that supplies electric power to the motor 3, and a current detection unit 13 that detects an electric current that flows through the stator coil of each phase of the motor 3.

The current detection unit 13 detects the U-phase current $I_U$, the V-phase current $I_V$ and the W-phase current $I_W$ that flow through the U-phase stator coil 51, the V-phase stator coil 52, and the W-phase stator coil 53 of the motor 3, respectively, (these phase currents will be collectively referred to as "three-phase detected current $I_{UVW}$" where appropriate). The U-phase current $I_U$, the V-phase current $I_V$ and the W-phase current $I_W$ are the current values in the directions of the axes of the UVW coordinate system. The microcomputer 11 includes a CPU and memories (a ROM, a RAM, etc.), and serves as multiple function processing units by executing predetermined programs. The multiple function processing units include a steering torque limiter 20, a command steering torque setting unit 21, a torque deviation calculation unit 22, a PI (proportional-integral) control unit 23, an addition angle limiter 24, a control angle calculation unit 26, a command current value preparation unit 30, current deviation calculation unit 32, a PI control unit 33, a γδ/UVW conversion unit 34, a PWM (Pulse Width Modulation) control unit 35, and a UVW/γδ conversion unit 36.

Figure 4:
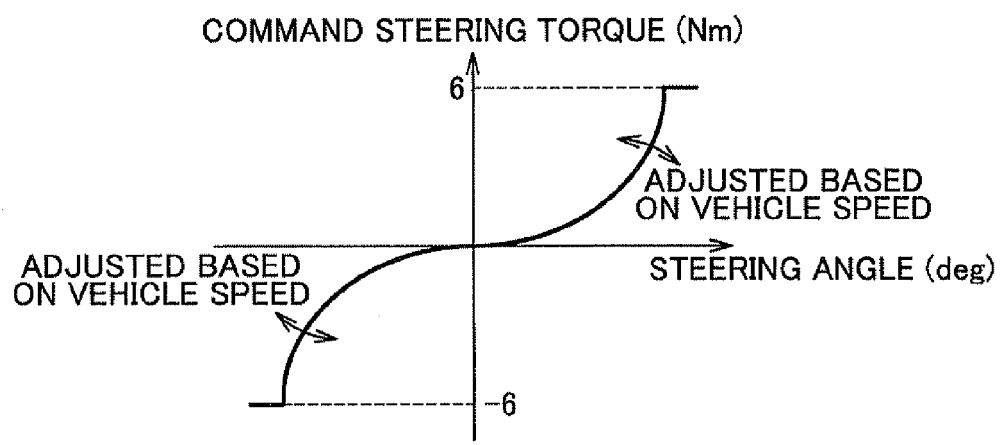
FIG. 4 is a graph showing an example of the characteristic of the command steering torque with respect to the steering angle.

The command steering torque setting unit 21 sets the command steering torque T* based on the steering angle detected by the steering angle sensor 4 and the vehicle speed detected by the vehicle speed sensor 6. For example, as shown in FIG. 4, the command steering torque T* when the steering angle is a positive value (when the steering wheel 10 is operated clockwise) is set to a positive value (torque applied in the clockwise direction), whereas the command steering torque T* when the steering angle is a negative value (when the steering wheel 10 is operated counterclockwise) is set to a negative value (torque applied in the counterclockwise direction). The command steering torque T* is set in such a manner that the absolute value of the command steering torque T* increases (non-linearly increases, in the example in FIG. 4) as the absolute value of the steering angle increases. However, the command steering torque T* is set to a value within a range between a predetermined upper limit (positive value (e.g. +6 Nm)) and a predetermined lower limit (negative value (e.g. −6 Nm)). In addition, the command steering torque T* is set in such a manner that the absolute value of the command steering torque T* decreases as the vehicle speed increases. That is, a vehicle speed-sensitive control is executed.

Figure 5:
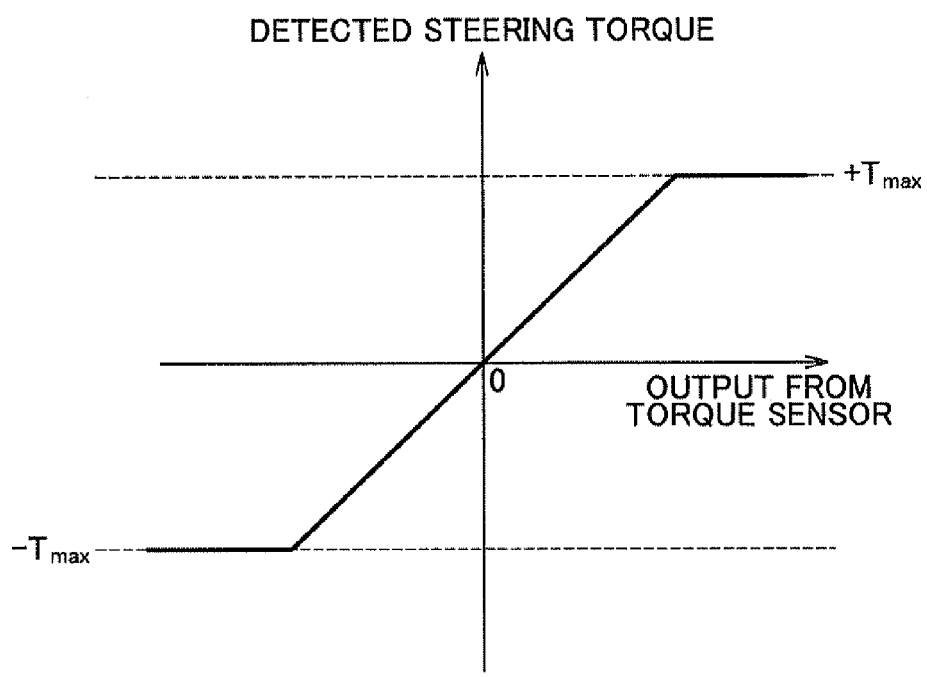
FIG. 5 is a graph for describing the function of a steering torque limiter.

The steering torque limiter 20 limits the output from the torque sensor 1 within a range between a predetermined upper saturation value $+T_{max}$ ($+T_{max} > 0$ (e.g. $+T_{max}$=7 Nm)) and a predetermined lower saturation value $-T_{max}$ ($-T_{max} < 0$ (e.g. $-T_{max}$=−7 Nm)). More specifically, as shown in FIG. 5, when the output from the torque sensor 1 is within the range between the upper saturation value $+T_{max}$ and the lower saturation value $-T_{max}$, the steering torque limiter 20 outputs the detected steering torque T that is the value output from the torque sensor 1 without correction. When the detected steering torque T from the torque sensor 1 is equal to or higher than the upper saturation value $+T_{max}$, the steering torque limiter 20 outputs the upper saturation value $+T_{max}$. When the detected steering torque T from the torque sensor 1 is equal to or lower than the lower saturation value $-T_{max}$, the steering torque limiter 20 outputs the lower saturation value $-T_{max}$. The saturation values $+T_{max}$ and $-T_{max}$ define a stable range (reliable range) of the output signal from the torque sensor 1. That is, in the range where the output from the torque sensor 1 is higher than the upper saturation value $+T_{max}$ and the range where the output from the torque sensor 1 is lower than the lower saturation value $-T_{max}$, the output signal from the torque sensor 1 is unstable and does not correspond to the actual steering torque. In other words, the saturation values $+T_{max}$ and $-T_{max}$ are determined based on the output characteristic of the torque sensor 1.

The torque deviation calculation unit 22 calculates the deviation (torque deviation) ΔT (T−T*) of the steering torque T that is detected by the torque sensor 1 and then subjected to the limitation process by the steering torque limiter 20 (hereinafter, will be referred to as "detected steering torque T") from the command steering torque T* set by the command steering torque setting unit 21. The PI control unit 23 executes the PI calculation on the torque deviation ΔT. That is, the torque deviation calculation unit 22 and the PI control unit 23 constitute a torque feedback control unit that brings the detected steering torque T to the command steering torque T*. The PI control unit 23 calculates the addition angle α for the control angle $\theta_C$ by executing the PI calculation on the torque deviation ΔT. Therefore, the torque feedback control unit constitutes an addition angle calculation unit that calculates the addition angle α.

The addition angle limiter 24 imposes limitations on the addition angle α obtained by the PI control unit 23. More specifically, the addition angle limiter 24 limits the addition angle α to a value within a range between a predetermined upper limit UL (positive value) and a predetermined lower limit LL (negative value). The upper limit UL and the lower limit LL are determined based on a predetermined limit $\omega_{max}$ ($\omega_{max} > 0$: e.g. preset value of $\omega_{max}$=45 degrees). The preset value of the predetermined limit $\omega_{max}$ is determined based on, for example, the maximum steering angular speed. The maximum steering angular speed is the maximum assumable value of the steering angular speed of the steering wheel 10, and, for example, approximately 800 deg/sec.

The rate of change in the electrical angle of the rotor 50 (angular speed in the electrical angle: maximum rotor angular speed) at the maximum steering angular speed is expressed by the product of the maximum steering angular speed, the speed reduction ratio of the speed reduction mechanism 7, and the number of pole pairs of the rotor 50, as indicated by Equation 2. The number of pole pairs is the number of magnetic pole pairs (pair of north pole and south pole) of the rotor 50.

$$\text{Maximum rotor angular speed} = \text{maximum steering angular speed} \times \text{speed reduction ratio} \times \text{number of pole pairs} \qquad \text{Equation 2}$$

The maximum value of the amount of change in the electrical angle of the rotor 50 between the calculations (in the calculation cycle) of the control angle $\theta_C$ is expressed by the value obtained by multiplying the maximum rotor angular speed by the calculation cycle, as indicated by Equation 3.

$$\text{Maximum value of amount of change in rotor angle} = \text{maximum rotor angular speed} \times \text{calculation cycle} = \text{maximum steering angular speed} \times \text{speed reduction ratio} \times \text{number of pole pairs} \times \text{calculation cycle} \qquad \text{Equation 3}$$

This maximum value of the amount of change in the rotor angle is the maximum amount of change in the control angle $\theta_C$ that is permitted within one calculation cycle. Therefore, the maximum value of the amount of change in the rotor angle may be used as the preset value of the limit $\omega_{max}$. With the use of the limit $\omega_{max}$, the upper limit UL and the lower limit LL for the addition angle α are expressed by Equation 4 and Equation 5, respectively.

$$UL = +\omega_{max} \quad \text{Equation 4}$$

$$LL = -\omega_{max} \quad \text{Equation 5}$$

The addition angle α obtained through the limitation process executed by the addition angle limiter 24 is added to the immediately preceding value $\theta_C(n-1)$ (n is the number of the present calculation cycle) of the control angle $\theta_C$ by an addition unit 26A of the control angle calculation unit 26 ("$Z^{-1}$" indicates the immediately preceding value indicated by a signal). Note that, the initial value of the control angle $\theta_C$ is a prescribed value (e.g. 0).

The control angle calculation unit 26 includes the addition unit 26A that adds the addition angle α provided from the addition angle limiter 24 to the immediately preceding value $\theta_C(n-1)$ of the control angle $\theta_C$. That is, the control angle calculation unit 26 calculates the control angle $\theta_C$ in predetermined calculation cycles. The control angle calculation unit 26 uses the control angle $\theta_C$ in the immediately preceding calculation cycle as the immediately preceding value $\theta_C(n-1)$, and obtains the present value $\theta_C(n)$ that is the control angle $\theta_C$ in the present calculation cycle based on the immediately preceding value $\theta_C(n-1)$. The command current value preparation unit 30 prepares, as command current values, values of electric currents that should be supplied to the coordinate axes (imaginary axes) of the γδ coordinate system, which is the imaginary rotating coordinate system that corresponds to the control angle $\theta_C$ that is a rotational angle used in the control. More specifically, the command current value preparation unit 30 prepares the γ-axis command current value $I_\gamma^*$ and the δ-axis command current value $I_\delta^*$ (hereinafter, these values will be collectively referred to as "two-phase command current value $I_{\gamma\delta}^*$" where appropriate). The command current value preparation unit 30 sets the γ-axis command current value $I_\gamma^*$ to a significant value, and sets the δ-axis command current value $I_\delta^*$ to 0. More specifically, the command current value preparation unit 30 sets the γ-axis command current value $I_\gamma^*$ based on the command steering torque T* that is set by the command steering torque setting unit 21 and the detected steering torque T that is detected by the torque sensor 1. That is, the command current value preparation unit 30 is a command current setting unit that sets the two-phase command current value $I_{\gamma\delta}$.

The command current value preparation unit 30 includes a command current increase/decrease amount calculation unit 30A, an addition unit 30B and an upper/lower limiter 30C. The command current increase/decrease amount calculation unit 30A calculates the current increase/decrease amount $\Delta I_\gamma^*$ for the command current value $I_\gamma^*$ based on the command steering torque T* and the detected steering torque T in predetermined calculation cycles. More specifically, the command current increase/decrease amount calculation unit 30A calculates the current increase/decrease amount $\Delta I_\gamma^*$ based on the sign of the command steering torque T* and the deviation $\Delta T$ (=T−T*) of the detected steering torque T from the command steering torque T*.

The basic concept of a method of calculating the current increase/decrease amount $\Delta I_\gamma^*$ using the command current increase/decrease amount calculation unit 30 will be described. When the absolute value of the torque deviation $\Delta T$ is equal to or smaller than the predetermined value A (A>0, see FIGS. 6A and 6B), the current increase/decrease amount $\Delta I_\gamma^*$ is set to 0 in order to maintain the present command current value $I_\gamma^*$. When the absolute value of the torque deviation $\Delta T$ is larger than the predetermined value A and the absolute value of the detected steering torque T is larger than the absolute value of the command steering torque T*, the command current value $I_\gamma^*$ is set to a value higher than 0 in order to fill up a deficiency in the assist torque. Thus, the command current value $I_\gamma^*$ is increased. On the other hand, when the absolute value of the torque deviation $\Delta T$ is larger than the predetermined value A and the absolute value of the detected steering torque T is smaller than the absolute value of the command steering torque T*, the command current value $I_\gamma^*$ is set to a value lower than 0 in order to suppress power consumption and generation of heat in the motor. Thus, the command current value $I_\gamma^*$ is decreased.

Figure 6A:
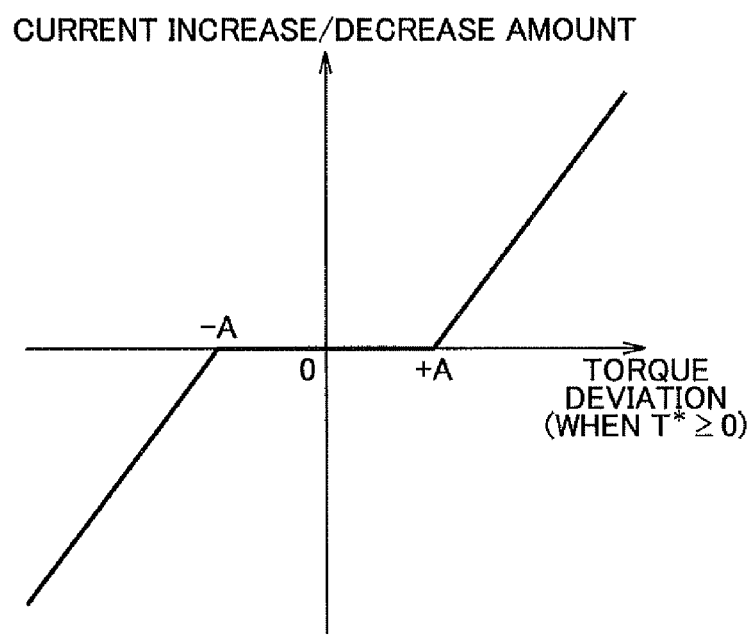
FIG. 6A is a graph showing an example of a manner of setting the current increase/decrease amount with respect to the torque deviation when the sign of the command steering torque is the positive sign.

FIG. 6A shows an example a manner of setting the current increase/decrease amount $\Delta I_\gamma^*$ with respect to the torque deviation $\Delta T$ when sign of the command steering torque T* is the positive sign (T*≥0). When the torque deviation $\Delta T$ is a value within a range equal to or larger than the predetermined value −A (A>0) and equal to or smaller than the predetermined value +A, the current increase/decrease amount $\Delta I_\gamma^*$ is set to 0. The current increase/decrease amount $\Delta I_\gamma^*$ is set such that as the torque deviation $\Delta T$ decreases from the predetermined value −A, the current increase/decrease amount $\Delta I_\gamma^*$ decreases (linearly decreases in the example in FIG. 6A) from 0. In addition, the current increase/decrease amount $\Delta I_\gamma^*$ is set such that as the torque deviation $\Delta T$ increases from the predetermined value +A, the current increase/decrease amount $\Delta I_\gamma^*$ increases (linearly increases in the example in FIG. 6A) from 0.

In the case where the sign of the command steering torque T* is the positive sign (T*≥0), when the torque deviation $\Delta T$ (=T−T*) is equal to or larger than 0, the absolute value of the detected steering torque T is larger than the absolute value of the command steering torque T*. Accordingly, in this case, it is considered that the motor torque (assist torque) is insufficient. Therefore, when the torque deviation $\Delta T$ is larger than the predetermined value +A, the current increase/decrease amount $\Delta I_\gamma^*$ is set to a positive value in order to fill up a deficiency in the assist torque. In this case, as the absolute value of the torque deviation $\Delta T$ increases, the absolute value of the current increase/decrease amount $\Delta I_\gamma^*$ also increases (becomes a positive value that has a larger absolute value).

On the other hand, when the torque deviation $\Delta T$ (=T−T*) is smaller than 0, the absolute value of the detected steering torque T is smaller than the absolute value of the command steering torque T*. Accordingly, in this case, it is considered that the motor torque (assist torque) is not insufficient. Therefore, when the torque deviation $\Delta T$ is smaller than the predetermined value −A, the current increase/decrease amount $\Delta I_\gamma^*$ is set to a negative value in order to suppress power consumption and generation of heat in the motor 3. In this case, as the absolute value of the torque deviation $\Delta T$ increases, the absolute value of the current increase/decrease amount $\Delta I_\gamma^*$ also increases (becomes a negative value that has a larger absolute value).

Figure 6B:
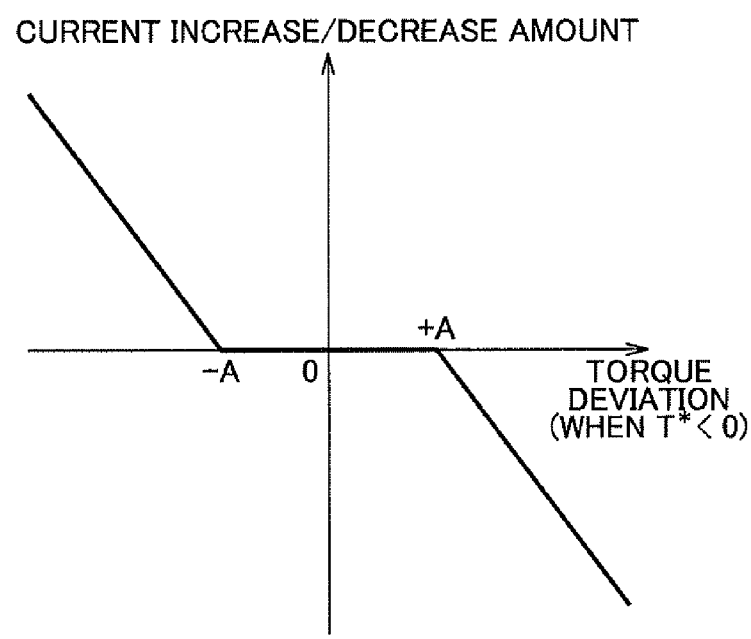
FIG. 6B is a graph showing an example of a manner of setting the current increase/decrease amount with respect to the torque deviation when the sign of the command steering torque is the negative sign.

FIG. 6B shows an example a manner of setting the current increase/decrease amount $\Delta I_\gamma^*$ with respect to the torque deviation $\Delta T$ when the sign of the command steering torque T* is the negative sign (T*<0). When the torque deviation $\Delta T$ is a value within the range equal to or larger than the predetermined value −A and equal to or smaller than the predetermined value +A, the current increase/decrease amount $\Delta I_\gamma^*$ is set to 0. The current increase/decrease amount $\Delta I_\gamma^*$ is set such that as the torque deviation $\Delta T$ decreases from the predetermined value −A, the current increase/decrease amount $\Delta I_\gamma^*$ increases (linearly increases in the example in FIG. 6B) from 0. In addition, the current increase/decrease amount $\Delta I_\gamma^*$ is set such that as the torque deviation $\Delta T$ increases from the predetermined value +A, the current increase/decrease amount $\Delta I_\gamma^*$ decreases (linearly decreases in the example in FIG. 6B) from 0.

In the case where the sign of the command steering torque T* is the negative sign (T*<0), when the torque deviation $\Delta T$ (=T−T*) is equal to or larger than 0, the absolute value of the detected steering torque T is smaller than the absolute value of the command steering torque T*. Accordingly, in this case, it is considered that the assist torque is not insufficient. Therefore, when the torque deviation $\Delta T$ is larger than the predetermined value +A, the current increase/decrease amount $\Delta I_\gamma^*$ is set to a negative value in order to suppress power consumption and generation of heat in the motor 3. In this case, as the absolute value of the torque deviation $\Delta T$ increases, the absolute value of the current increase/decrease amount $\Delta I_\gamma^*$ also increases (becomes a negative value that has a larger absolute value).

On the other hand, when the torque deviation $\Delta T$ (=T−T*) is smaller than 0, the absolute value of the detected steering torque T is larger than the absolute value of the command steering torque T*. Accordingly, in this case, it is considered that the assist torque is insufficient. Therefore, when the torque deviation $\Delta T$ is smaller than the predetermined value −A, the current increase/decrease amount $\Delta I_\gamma^*$ is set to a positive value in order to fill up a deficiency in the assist torque. In this case, as the absolute value of the torque deviation $\Delta T$ increases, the absolute value of the current increase/decrease amount $\Delta I_\gamma^*$ also increases (becomes a positive value that has a larger absolute value).

The current increase/decrease amount $\Delta I_\gamma^*$ calculated by the command current increase/decrease amount calculation unit 30A is added to the immediately preceding value $I_\gamma^*(n-1)$ ("n" is the number of the present calculation cycle) of the command current value $I_\gamma^*$ by the addition unit 3013 ("$Z^{-1}$" indicates the immediately preceding value indicated by a signal). Thus, the command current value $I_\gamma^*$ in the present calculation cycle is calculated. Note that the initial value of the command current value $I_\gamma^*$ is a prescribed value (e.g. 0). The command current value $I_\gamma^*$ obtained by the addition unit 3013 is provided to the upper/lower limiter 30C. The upper/lower limiter 30C limits the command current value $I_\gamma^*$ obtained by the addition unit 30B to a value within a range from the predetermined lower limit $\xi_{min}$ ($\xi_{min} \geq 0$) to the predetermined upper limit $\xi_{max}$ ($\xi_{max} > \xi_{min}$).

That is, when the command current value $I_\gamma^*$ obtained by the addition unit 30B is equal to or higher than the lower limit $\xi_{min}$ and equal to or lower than the upper limit $\xi_{max}$, the upper/lower limiter 30C outputs the command current value $I_\gamma^*$ without correction. When the command current value $I_\gamma^*$ obtained by the addition unit 30B is lower than the lower limit $\xi_{min}$, the upper/lower limiter 30C outputs the lower limit $\xi_{min}$ as the command current value $I_\gamma^*$ in the present calculation cycle. When the command current value $I_\gamma^*$ obtained by the addition unit 30B is higher than the upper limit $\xi_{max}$, the upper/lower limiter 30C outputs the upper limit $\xi_{max}$ as the command current value $I_\gamma^*$ in the present calculation cycle.

The current deviation calculation unit 32 calculates the deviation $I_\gamma^* - I_\gamma$ of the γ-axis detected current $I_\gamma$ from the γ-axis command current value $I_\gamma^*$ prepared by the command current value preparation unit 30, and the deviation $I_\delta^* - I_\delta$ of the δ-axis detected current $I_\delta$ from the δ-axis command current value $I_\delta$ (=0). The γ-axis detected current $I_\gamma$ and the δ-axis detected current $I_\delta$ are provided from the UVW/γδ conversion unit 36 to the deviation calculation unit 32.

The UVW/γδ conversion unit 36 converts the three-phase detected current $I_{UVW}$ (U-phase detected current $I_U$, V-phase detected current $I_V$, and the W-phase detected current $I_W$) of the UVW coordinate system, which is detected by the current detection unit 13, into the two-phase detected currents $I_\gamma$ and $I_\delta$ of the γδ coordinate system (hereinafter, these phase currents will be collectively referred to as "two-phase detected current $I_{\gamma\delta}$" where appropriate). These two-phase detected currents $I_\gamma$ and $I_\delta$ are provided to the current deviation calculation unit 32. The control angle $\theta_C$ calculated by the control angle calculation unit 26 is used for the coordinate conversion that is executed by the UVW/γδ conversion unit 36.

The PI control unit 33 executes the PI calculation on the current deviation calculated by the current deviation calculation unit 32 to prepare the two-phase command voltage $V_{\gamma\delta}^*$ (the γ-axis command voltage $V_\gamma^*$ and the δ-axis command voltage $V_\delta^*$) that should be applied to the motor 3. The two-phase command voltage $V_{\gamma\delta}^*$ is provided to the γδ/UVW conversion unit 34. The γδ/UVW conversion unit 34 executes the coordinate conversion calculation on the two-phase command voltage $V_{\gamma\delta}^*$ to prepare the three-phase command voltage $V_{UVW}^*$. The control angle $\theta_C$ calculated by the control angle calculation unit 26 is used for this coordinate conversion. The three-phase command voltage $V_{UVW}^*$ is formed of the U-phase command voltage $V_U^*$, the V-phase command voltage $V_V^*$ and the W-phase command voltage $V_W^*$. The three-phase command voltage $V_{UVW}^*$ is provided to the PWM control unit 35.

The PWM control unit 35 prepares the U-phase PWM control signal, the V-phase PWM control signal and the W-phase PWM control signal having duty ratios that correspond to the U-phase command voltage $V_U^*$, the V-phase command voltage $V_V^*$ and the W-phase command voltage $V_W^*$, respectively, and provides the control signals to the drive circuit 12. The drive circuit 12 is formed of an inverter circuit having three phases that correspond to the U-phase, the V-phase and the W-phase. The power elements that constitute the inverter circuit are controlled based on the PWM control signals provided from the PWM control unit 35, and therefore the voltages that correspond to the three-phase command voltage $V_{UVW}^*$ are applied to the U-phase stator coil 51, the V-phase stator coil 52 and the W-phase stator coil 53 of the motor 3.

Figure 3:
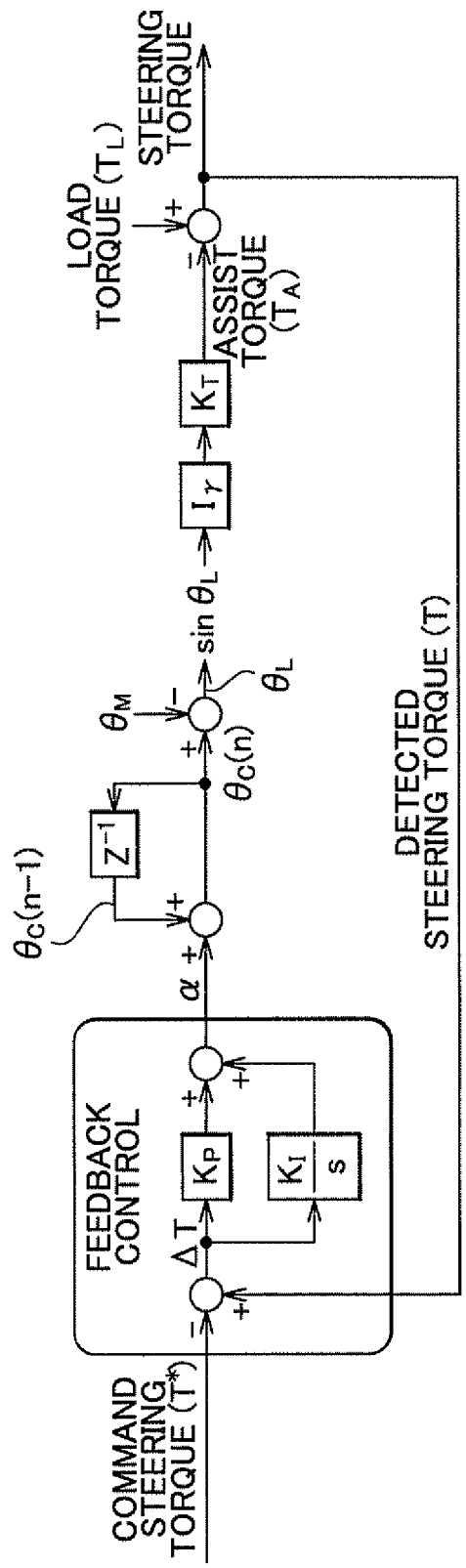
FIG. 3 is a control block diagram for the electric power steering system.

The current deviation calculation unit 32 and the PI control unit 33 constitute a current feedback control unit. The current feedback control unit controls the electric current that is supplied to the motor 3 in such a manner that the electric current that is supplied to the motor 3 approaches the two-phase command current value $I_{\gamma\delta}^*$ that is set by the command current value preparation unit 30. FIG. 3 is a control block diagram of the electric power steering system. Note that the function of the addition angle limiter 24 is omitted to simplify the explanation.

Through the PI control ($K_P$ is a proportionality coefficient, $K_I$ is an integration coefficient, and 1/s is an integration operator) on the deviation (torque deviation) $\Delta T$ of the detected steering torque T from the command steering torque T*, the addition angle α is prepared. The present value $\theta_C(n)$ ($\theta_C(n) = \theta_C(n-1) + \alpha$) of the control angle $\theta_C$ is obtained by adding the addition angle α to the immediately preceding value $\theta_C(n-1)$ of the control angle $\theta_C$. At this time, the deviation of the actual rotor angle $\theta_M$ of the rotor 50 from the control angle $\theta_C$ is used as the load angle $\theta_L$ ($\theta_L = \theta_C - \theta_M$).

Therefore, if the γ-axis current $I_\gamma$ is supplied to the γ-axis (imaginary axis) in the γδ coordinate system (imaginary rotating coordinate system), which rotates in accordance with the control angle $\theta_C$, based on the γ-axis command current value $I_\gamma^*$, the q-axis current $I_q$ is equal to $I_\gamma \sin \theta_L$ ($I_q = I_\gamma \sin \theta_L$). The q-axis current $I_q$ contributes to generation of torque by the rotor 50. That is, the value obtained by multiplying the q-axis current $I_q$ (=$I_\gamma \sin \theta_L$) by the torque constant $K_T$ of the motor 3 is transmitted to the steering mechanism 2 via the speed reduction mechanism 7 as the assist torque $T_A$ (=$K_T \times I_\gamma \sin \theta_L$). The value obtained by subtracting the assist torque $T_A$ from the load torque $T_L$ from the steering mechanism 2 is the steering torque that should be applied by the driver to the steering wheel 10. When the steering torque is fed back through the steering torque limiter 20, a system is operated in such a manner that the steering torque is brought to the command steering torque T*. That is, the addition angle α is obtained and the control angle $\theta_C$ is controlled based on the addition angle α so that the detected steering torque T coincides with the command steering torque T*.

The control angle $\theta_C$ is updated with the use of the addition angle α that is obtained based on the deviation ΔT of the detected steering torque T from the command steering torque T* while an electric current is supplied to the γ-axis that is the imaginary axis used in the control. Thus, the load angle $\theta_L$ changes and therefore, the torque that corresponds to the load angle $\theta_L$ is generated by the motor 3. Therefore, the torque that corresponds to the command steering torque T* set based on the steering angle and the vehicle speed is generated by the motor 3. Accordingly, an appropriate steering assist force that corresponds to the steering angle and the vehicle speed is applied to the steering mechanism 2. That is, a steering assist control is executed in such a manner that the steering torque increases as the absolute value of the steering angle increases and the steering torque decreases as the vehicle speed increases.

Figure 7:
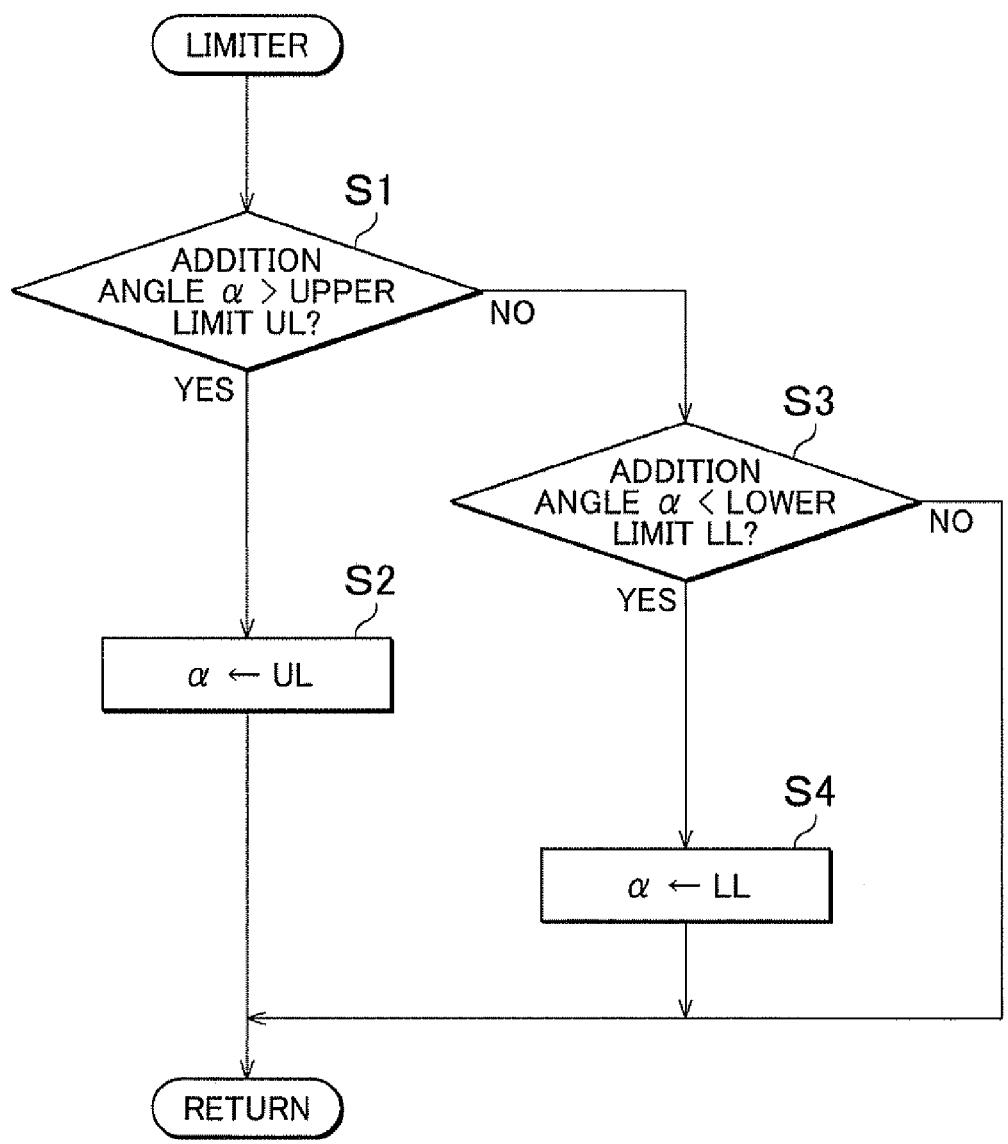
FIG. 7 is a flowchart for describing the function of an addition angle limiter.

Therefore, there is provided the electric power steering system in which an appropriate steering assist operation is executed by appropriately controlling the motor 3 without using a rotational angle sensor. Thus, the configuration is simplified and cost is reduced. FIG. 7 is a flowchart for describing the function of the addition angle limiter 24. The addition angle limiter 24 compares the addition angle α obtained by the PI control unit 23 with the upper limit UL (step (hereinafter, referred to as "S") 1). When the addition angle α is larger than the upper limit UL ("YES" in S1), the upper limit UL is substituted for the addition angle α (S2). Thus, the upper limit UL (=+$\omega_{max}$) is added to the control angle $\theta_C$.

When the addition angle α obtained by the PI control unit 23 is equal to or smaller than the upper limit UL ("NO" in S1), the addition angle limiter 24 further compares the addition angle α with the lower limit LL (S3). When the addition angle α is smaller than the lower limit LL ("YES" in S3), the lower limit LL is substituted for the addition angle α (S4). Thus, the lower limit LL (=−$\omega_{max}$) is added to the control angle $\theta_C$.

When the addition angle α obtained by the PI control unit 23 is equal to or larger than the lower limit LL and equal to or smaller than the upper limit UL ("NO" in S3), the addition angle α is added to the control angle $\theta_C$ without correction. Therefore, the addition angle limiter 24 limits the addition angle α to a value within the range between the upper limit UL and the lower limit LL so as to stabilize the control. More specifically, although the control state is unstable (assist force is unstable) when the electric current is low or when the control starts, the control is encouraged to move to the stable state.

In the first embodiment, when the absolute value of the detected steering torque T is larger than the absolute value of the command steering torque T*, that is, when the assist torque is insufficient, the current increase/decrease amount $\Delta I_\gamma^*$ calculated by the command current increase/decrease amount calculation unit 30A of the command current value preparation unit 30 is a positive value. In this case, as the absolute value of the torque deviation ΔT becomes larger, the absolute value of the current increase/decrease amount $\Delta I_\gamma^*$ also becomes larger (becomes a positive value having a larger absolute value). Then, the current increase/decrease amount $\Delta I_\gamma^*$ is added to the immediately preceding value of the command current value by the addition unit 3013. Therefore, the command current value $I_\gamma^*$ in the present calculation cycle becomes higher than that in the immediately preceding cycle. As a result, a deficiency in the assist torque is filled up, and the steering torque T is promptly brought to the command steering torque T*.

On the other hand, when the absolute value of the detected steering torque T is smaller than the absolute value of the command steering torque T*, the current increase/decrease amount $\Delta I_\gamma^*$ calculated by the command current increase/decrease amount calculation unit 30A of the command current value preparation unit 30 is a negative value. In this case, as the absolute value of the torque deviation ΔT becomes larger, the absolute value of the current increase/decrease amount $AI_\gamma^*$ also becomes larger (becomes a negative value having a larger absolute value). Then, the current increase/decrease amount $\Delta I_\gamma^*$ is added to the immediately preceding value of the command current value $I_\gamma^*$ by the addition unit 30B. Therefore, the command current value $I_\gamma^*$ in the present calculation cycle becomes lower than that in the immediately preceding cycle. Thus, the power consumption is suppressed and generation of heat in the motor 3 is suppressed.

Figure 8:
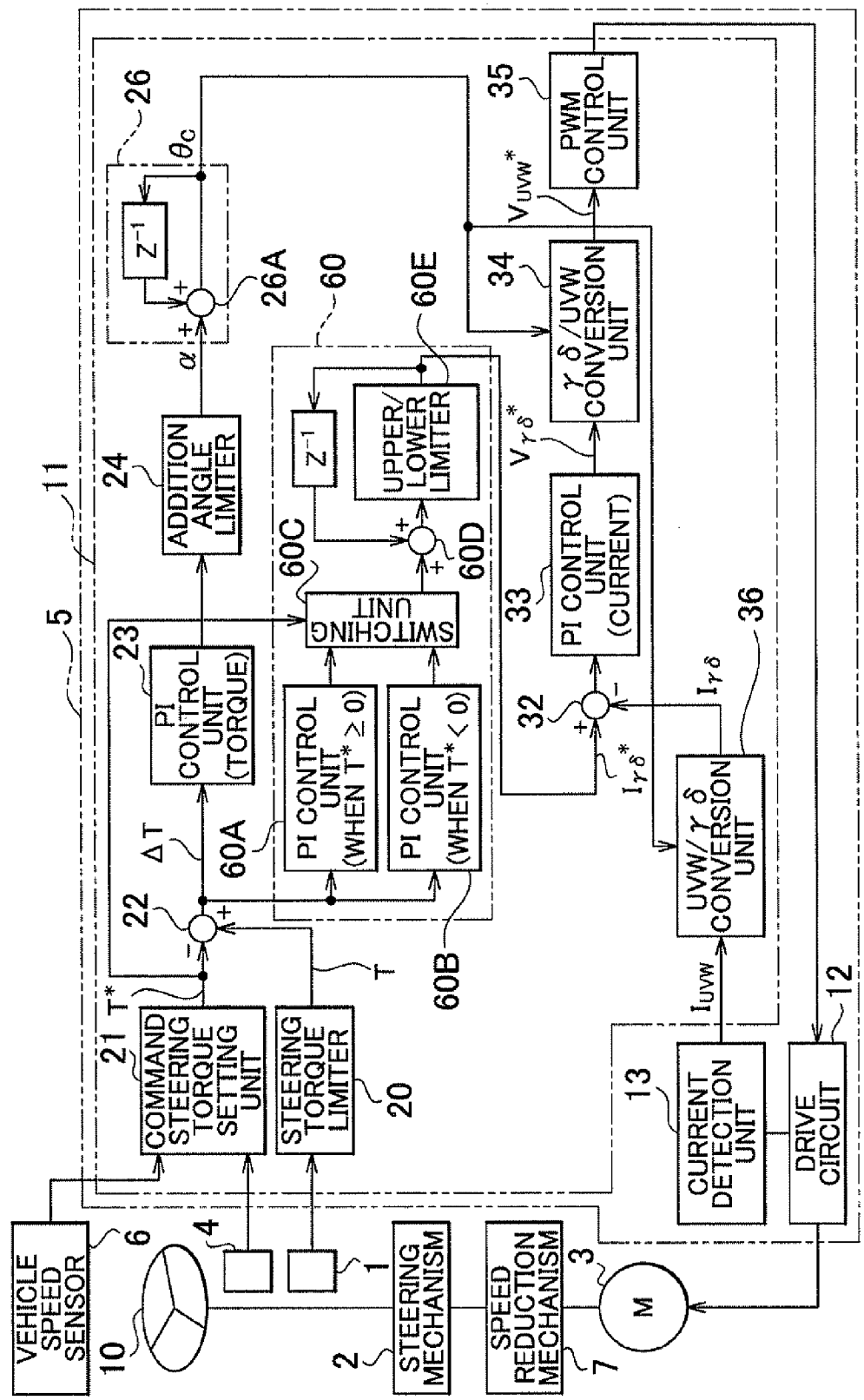
FIG. 8 is a block diagram for describing the configuration of an electric power steering system to which a motor control unit according to a second embodiment of the invention is applied.

Also, the command current value $I_\gamma^*$ obtained by the addition unit 30B is limiter by the upper/lower limiter 30C. Therefore, it is possible to prevent the command current value $I_\gamma^*$ from being excessive. Thus, it is possible to appropriately control the torque. FIG. 8 is a block diagram for describing the configuration of an electric power steering system to which a motor control unit according to a second embodiment of the invention is applied. In FIG. 8, the portions that correspond to those in FIG. 1 are denoted by the same reference numerals as those in FIG. 1.

In the second embodiment, a command current value preparation unit 60 is provided instead of the command current value preparation unit 30 shown in FIG. 1. The command current value preparation unit 60 sets the γ-axis command current value $I_\gamma^*$ to a significant value while setting the δ-axis command current value $I_\delta^*$ to 0. More specifically, the command current value preparation unit 60 sets the γ-axis command current value $I_\gamma^*$ based on the command steering torque T* set by the command steering torque setting unit 21 and the torque deviation ΔT calculated by the torque deviation calculation unit 22. The torque deviation calculation unit 22 calculates the deviation ΔT (=T−T*) of the steering torque (detected steering torque T) that is detected by the torque sensor 1 and then subjected to the limitation process by the steering torque limiter 20 from the command steering torque T* set by the command steering torque setting unit 21.

The command current value preparation unit 60 includes a first PI control unit 60A, a second PI control unit 60B, a switching unit 60C, an addition unit 60D, and an upper/lower limiter 60E. The first PI control unit 60A calculates the current increase/decrease amount $\Delta I_\gamma^*$ for the command current value $I_\gamma^*$ by executing the PI control on the torque deviation ΔT on the assumption that the sign of the command steering torque T* is the positive sign. When the sign of the command steering torque T* is the positive sign, the first PI control unit 60A executes a feedback control on the current increase/decrease amount $\Delta I_\gamma^*$ so that the torque deviation $\Delta T$ becomes 0. That is, in the case where the sign of the command steering torque T* is the positive sign (T*≥0), when the torque deviation $\Delta T$ (=T−T*) is equal or larger than 0 (when the assist torque is insufficient), the first PI control unit 60A calculates the current increase/decrease amount $\Delta I_\gamma^*$, which is a positive value, so that the deviation $\Delta T$ approaches 0. When the torque deviation $\Delta T$ is smaller than 0, the first PI control unit 60A calculates the current increase/decrease amount which is a negative value, so that the deviation $\Delta T$ approaches 0. In each of these cases, the absolute value of the current increase/decrease amount $\Delta I_\gamma^*$ increases as the absolute value of the torque deviation $\Delta T$ increases.

The second PI control unit 60B calculates the current increase/decrease amount $\Delta I_\gamma^*$ for the command current value $I_\gamma^*$ by executing the PI control on the torque deviation $\Delta T$ on the assumption that the sign of the command steering torque T* is the negative sign. When the sign of the command steering torque T* is the negative sign, the second PI control unit 60B executes a feedback control on the current increase/decrease amount $\Delta I_\gamma^*$ so that the torque deviation $\Delta T$ becomes 0. That is, in the case where the sign of the command steering torque T* is the negative sign (T*<0), when the torque deviation $\Delta T$ (=T−T*) is equal or larger than 0, the second PI control unit 60B calculates the current increase/decrease amount $\Delta I_\gamma^*$, which is a negative value, so that the deviation $\Delta T$ approaches 0. When the torque deviation $\Delta T$ is smaller than 0 (when the assist torque is insufficient), the second PI control unit 60B calculates the current increase/decrease amount $\Delta I_\gamma^*$, which is a positive value, so that the deviation $\Delta T$ approaches 0. In each of these cases, the absolute value of the current increase/decrease amount $\Delta I_\gamma^*$ increases as the absolute value of the torque deviation $\Delta T$ increases.

The switching unit 60C selects one of the current increase/decrease amount $\Delta I_\gamma^*$ calculated by the first PI control unit 60A and the current increase/decrease amount $\Delta I_\gamma^*$ calculated by the second PI control unit 60B depending on the sign of the command steering torque T*, and outputs the selected current increase/decrease amount $\Delta I_\gamma^*$. More specifically, when the sign of the command steering torque T* is the positive sign, the switching unit 60C selects and outputs the current increase/decrease amount $\Delta I_\gamma^*$ calculated by the first PI control unit 60A. On the other hand, when the sign of the command steering torque T* is the negative sign, the switching unit 60C selects and outputs the current increase/decrease amount $\Delta I_\gamma^*$ calculated by the second PI control unit 60B.

The current increase/decrease amount $\Delta I_\gamma^*$ output from the switching unit 60C is added to the immediately preceding value $I_\gamma^*(n-1)$ ("n" is the number of the present calculation cycle) of the command current value $I_\gamma^*$ by the addition unit 60D ("Z$^{-1}$" indicates the immediately preceding value indicated by a signal). Thus, The command current value $I_\gamma^*$ in the present calculation cycle is calculated. Note that, the initial value of the command current value $I_\gamma^*$ is a prescribed value (e.g. 0). The command current value $I_\gamma^*$ obtained by the addition unit 60D is provided to the upper/lower limiter 60E. The upper/lower limiter 60E limits the command current value $I_\gamma^*$ obtained by the addition unit 60D to a value within a range from the predetermined lower limit $\xi_{min}$ ($\xi_{min}$≥0) to the predetermined upper limit $\xi_{max}$ ($\xi_{max}$>$\xi_{min}$).

That is, when the command current value iv obtained by the addition unit 60D is equal to or higher than the lower limit $\xi_{min}$ and equal to or lower than the upper limit $\xi_{max}$, the upper/lower limiter 60E outputs the command current value $I_\gamma^*$ without correction. When the command current value $I_\gamma^*$ obtained by the addition unit 60D is lower than the lower limit $\xi_{min}$, the upper/lower limiter 60E outputs the lower limit $\xi_{min}$ as the command current value $I_\gamma^*$ in the present calculation cycle. When the command current value $I_\gamma^*$ obtained by the addition unit 60D is higher than the upper limit $\xi_{max}$, the upper/lower limiter 60E outputs the upper limit $\xi_{max}$ as the command current value $I_\gamma^*$ in the present calculation cycle. In the second embodiment as well, it is possible to obtain the same effects as those in the first embodiment.

Figure 9:
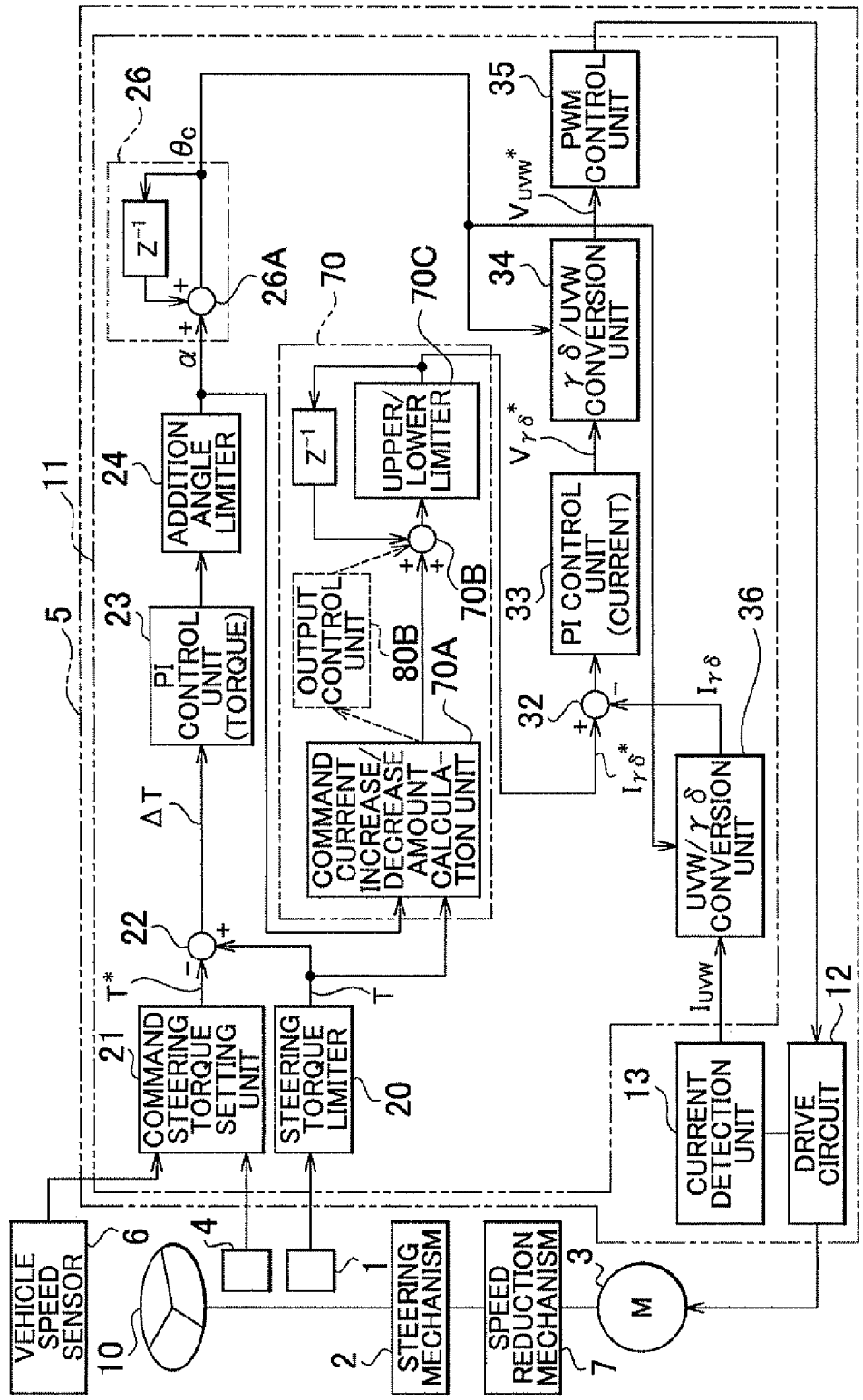
FIG. 9 is a block diagram for describing the configuration of an electric power steering system to which a motor control unit according to a third embodiment of the invention is applied.

FIG. 9 is a block diagram for describing the configuration of an electric power steering system to which a motor control unit according to a third embodiment of the invention is applied. In FIG. 9, the portions that correspond to those in FIG. 1 are denoted by the same reference numerals as those in FIG. 1. In the third embodiment, a command current value preparation unit 70 is provided instead of the command current value preparation unit 30 shown in FIG. 1. The command current value preparation unit 70 sets the γ-axis command current value $I_\gamma^*$ to a significant value, and sets the δ-axis command current value $I_\delta^*$ to 0. More specifically, the command current value preparation unit 70 sets the γ-axis command current value $I_\gamma^*$ based on the steering torque (detected steering torque T) that is detected by the torque sensor 1 and then subjected to the limitation process by the steering torque limiter 20 and the addition angle α calculated by the PI control unit 23 and then subjected to the limitation process by the addition angle limiter 24.

More specifically, the command current value preparation unit 70 sets the γ-axis command current value $I_\gamma^*$ based on the ratio between the change amount δT of the detected steering torque T (hereinafter, referred to as "steering torque change amount δT") and the addition angle α. The steering torque change amount δT is obtained by subtracting the detected steering torque T(n−1) in the immediately preceding calculation cycle from the detected steering torque T(n) in the present calculation cycle. The command current value preparation unit 70 includes a command current increase/decrease amount calculation unit 70A, an addition unit 70B and an upper/lower limiter 70C.

The command current increase/decrease amount calculation unit 70A calculates the current increase/decrease amount $\Delta I_\gamma^*$ for the command current value $I_\gamma^*$ based on the absolute value of the ratio of the steering torque change amount δT to the addition angle α (|δT/α|), the absolute value of the ratio of the addition angle α to the steering torque change amount δT (|α/δT|), and the present command current value $I_\gamma^*$ (immediately preceding value of the command current value $I_\gamma^*$). The ratio of the steering torque change amount δT to the addition angle α (δT/α) is obtained by dividing the steering torque change amount δT calculated in the present calculation cycle by the addition angle α calculated by the PT control unit 23 and then subjected to the limitation process by the addition angle limiter 24 in the immediately preceding calculation cycle or the present calculation cycle. The ratio of the addition angle α to the steering torque change amount δT (α/δT) is obtained by dividing the addition angle α calculated by the PI control unit 23 and then subjected to the limitation process by the addition angle limiter 24 in the immediately preceding calculation cycle or the present calculation cycle by the steering torque change amount δT calculated in the present calculation cycle.

The command current increase/decrease amount calculation unit 70A calculates the current increase/decrease amount $\Delta I_\gamma^*$ for the command current value $I_\gamma^*$ in the following manner. The relationship between the absolute value of the ratio of the steering torque change amount δT to the addition angle α (|δT/α|) and the current increase/decrease amount $\Delta I_\gamma^*$ is set in advance. Also, the relationship between the absolute value of the ratio of the addition angle $\alpha$ to the steering torque change amount $\delta T$ ($|\alpha/\delta T|$) and the current increase/decrease amount $\Delta I_\gamma^*$ is set in advance. In addition, the relationship between the present command current value $I_\gamma^*$ and the increase/decrease amount gain G is set in advance.

When the value $\delta T$ that is used as the denominator of the ratio of the addition angle $\alpha$ to the steering torque change amount $\delta T$ ($\alpha/\delta T$) is a small value near 0, an error is likely to be generated in the calculated value of the ratio $\alpha/\delta T$. Therefore, the command current increase/decrease amount calculation unit 70A calculates the base value of the current increase/decrease amount $\Delta I_\gamma^*$ based on the absolute value of the other ratio ($|\delta T/\alpha|$). Then, the command current increase/decrease amount calculation unit 70A calculates the final current increase/decrease amount $\Delta I_\gamma^*$ by multiplying the base value by the increase/decrease amount gain G corresponding to the present command current value $I_\gamma^*$.

On the other hand, when the value $\alpha$ that is used as the denominator of ratio of the steering torque change amount $\delta T$ to the addition angle $\alpha$ ($\delta T/\alpha$) is a small value near 0, an error is likely to be generated in the calculated value of the ratio $\delta T/\alpha$. Therefore, the command current increase/decrease amount calculation unit 70A calculates the base value of the current increase/decrease amount $\Delta I_\gamma^*$ based on the absolute value of the other ratio ($|\alpha/\delta T|$). Then, the command current increase/decrease amount calculation unit 70A calculates the final current increase/decrease amount $\Delta I_\gamma^*$ by multiplying the base value by the increase/decrease amount gain G corresponding to the present command current value $I_\gamma^*$.

Figure 10A:
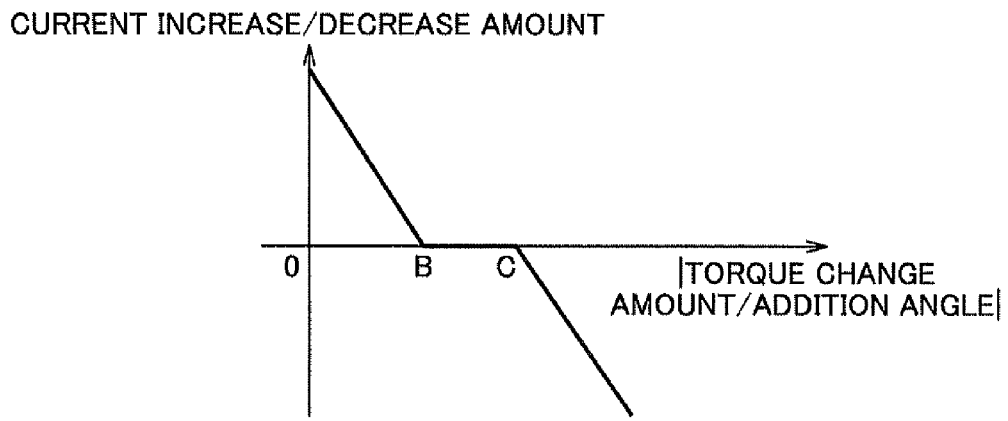
FIG. 10A is a graph showing an example of a manner of setting the current increase/decrease amount with respect to the absolute value of the ratio of the steering torque change amount to the addition angle.

FIG. 10A shows an example of a manner of setting the current increase/decrease amount $\Delta I_\gamma^*$ with respect to the absolute value of the ratio of the steering torque change amount $\delta T$ to the addition angle $\alpha$ ($|\delta T/\alpha|$). When the absolute value ($|\delta T/\alpha|$) is within a range equal to or larger than the predetermined value B (B>0) and equal to or smaller than the predetermined value C (C>B), the current increase/decrease amount $\Delta I_\gamma^*$ is set to 0. Then, the current increase/decrease amount $\Delta I_\gamma^*$ is set such that as the absolute value ($|\delta T/\alpha|$) increases from the predetermined value C, the current increase/decrease amount $\Delta I_\gamma^*$ decreases (linearly decreases in the example in FIG. 10A) from 0. The current increase/decrease amount $\Delta I_\gamma^*$ is set such that as the absolute value ($|\delta T/\alpha|$) decreases from the predetermined value B, the current increase/decrease amount $\Delta I_\gamma^*$ increases (linearly increases in the example in FIG. 10A) from 0. The reason why the current increase/decrease amount $\Delta I_\gamma^*$ is set in the manner shown in FIG. 10A will be described below.

Figure 11:
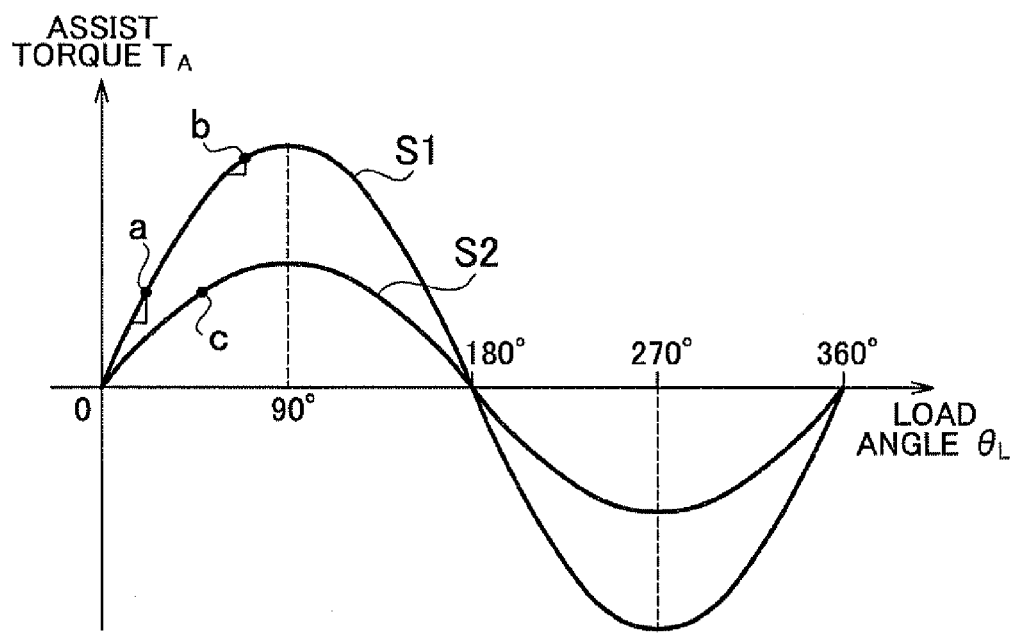
FIG. 11 is a graph for describing the function of a command current increase/decrease amount calculation unit.

FIG. 11 shows the relationship between the load angle $\theta_L$ and the assist torque $T_A$. As described above with reference to FIG. 2, the q-axis current $I_q$ is expressed by equation that uses the load angle $\theta_L$ and the $\gamma$-axis current $I_\gamma$, $I_q = I_\gamma \sin\theta_L (\theta_L = \theta_C - \theta_M)$. The assist torque $T_A$ is a value obtained by multiplying the q-axis current $I_q$ by the torque constant $K_T$ of the motor 3. Therefore, a change in the assist torque $T_A$ with respect to the load angle $\theta_L$ is expressed by a curve (sine curve) shown in FIG. 11. In FIG. 11, the curve S1 shows the characteristic when the $\gamma$-axis current $I_\gamma$ is a relatively high value, and the curve S2 shows the characteristic when the $\gamma$-axis current $I_\gamma$ is a relatively low value. In this embodiment, the PI control unit 23 operates such that the load angle $\theta_L$ is controlled within a range where the load angle $\theta_L$ is equal to or larger than 0° and equal to or smaller than 90° and a range where the load angle $\theta_L$ is equal to or larger than 270° and equal to or smaller than 360° (hereinafter, referred to as "range where the load angle $\theta_L$ is equal to or larger than −90° and equal to or smaller than 90°"). In these ranges, the assist torque monotonously increases. The PI control unit 23 may operate such that the load angle $\theta_L$ is controlled within a range where the load angle $\theta_L$ is equal to or larger than 90° and equal to or smaller than 270°. In this range, the assist torque monotonously decreases.

When the absolute value of the ratio of the steering torque change amount $\delta T$ to the addition angle $\alpha$ ($|\delta T/\alpha|$) is large, the amount of change in the assist torque $T_A$ with respect to the amount of change in the load angle $\theta_L$ is large. Therefore, it is considered that the load angle $\theta_L$ is near 0°. For example, when the assist torque characteristic is expressed by the curve S1 in FIG. 11, the inclination (corresponding to the ratio $\delta T/\alpha$) of the curve S1 at the point a at which the load angle $\theta_L$ is near 0° is higher than the inclination of the curve S1 at the point b near 90°.

When the load angle $\theta_L$ is near 0°, the efficiency of the assist torque $T_A$ with respect to the $\gamma$-axis current $I_\gamma$ is low. When the load angle $\theta_L$ is near 90° (or −90°), the efficiency of the assist torque $T_A$ with respect to the $\gamma$-axis current $I_\gamma$ is high. This is because when the load angle $\theta_L$ is near 90°, the magnetic field of the coil can be generated in the direction substantially perpendicular to the rotor 50. If the $\gamma$-axis current $I_\gamma$ is decreased when the load angle $\theta_L$ is near 0°, control is executed such that the load angle $\theta_L$ becomes a value near 90° in order to generate the same magnitude of assist torque. Therefore, it is possible to increase the efficiency of the assist torque $T_A$ with respect to the $\gamma$-axis current $I_\gamma$. For example, when the operation point is at the point a on the curve S1, if the $\gamma$-axis current $I_\gamma$ is decreased, it is possible to shift the operation point to the point c on the curve S2.

For the reason described above, as shown in FIG. 10A, the current increase/decrease amount $\Delta I_\gamma^*$ is set such that as the absolute value of the ratio of the steering torque change amount $\delta T$ to the addition angle $\alpha$ ($|\delta T/\alpha|$) increases from the predetermined value C, the current increase/decrease amount $\Delta I_\gamma^*$ decreases from 0. When the absolute value of the ratio of the steering torque change amount $\delta T$ to the addition angle $\alpha$ ($|\delta T/\alpha|$) is small, the amount of change in the assist torque $T_A$ with respect to the amount of change in the load angle $\theta_L$ is small, Therefore, it is considered that the load angle $\theta_L$ is near 90° (or −90°). When the load angle $\theta_L$ is near 90°, the assist torque has reached the substantially maximum value at the present $\gamma$-axis current $I_\gamma$, and there is a possibility that the detected steering torque T cannot be brought to the command steering torque T* due to shortage of the assist torque. Therefore, in this case, preferably, the $\gamma$-axis current $I_\gamma$ is increased to increase the assist torque. For the reason described above, as shown in FIG. 10A, the current increase/decrease amount $\Delta I_\gamma^*$ is set such that as the absolute value of the ratio of the steering torque change amount $\delta T$ to the addition angle $\alpha$ ($|\delta T/\alpha|$) decreases from the predetermined value B, the current increase/decrease amount $\Delta I_\gamma^*$ increases from 0.

Figure 10B:
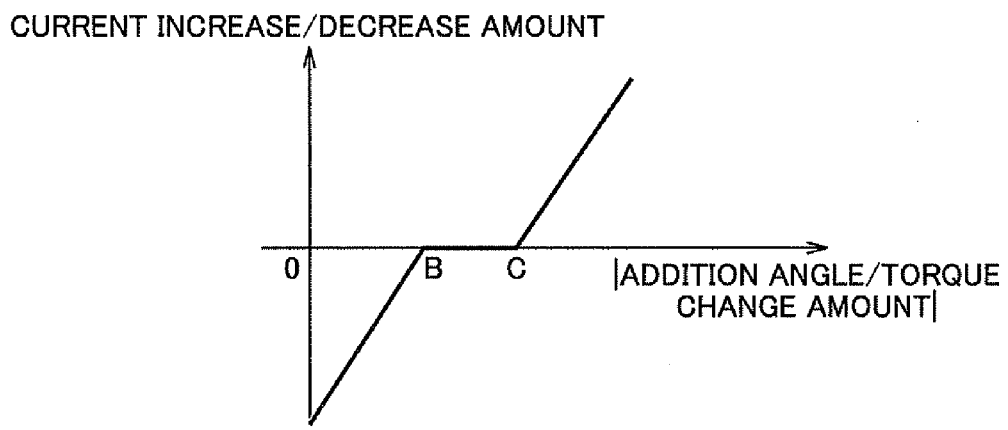
FIG. 10B is a graph showing an example of a manner of setting the current increase/decrease amount with respect to the absolute value of the ratio of the addition angle to the steering torque change amount.

FIG. 10B shows an example of a manner of setting the current increase/decrease amount $\Delta I_\gamma^*$ with respect to the absolute value of the ratio of the addition angle $\alpha$ to the steering torque change amount $\delta T$ ($|\alpha/\delta T|$). When the absolute value $|\alpha/\delta T|$ is within a range equal to or larger than the predetermined value B (B>0) and equal to or smaller than the predetermined value C (C>B), the current increase/decrease amount $\Delta I_\gamma^*$ is set to 0. The current increase/decrease amount $\Delta I_\gamma^*$ is set such that as the absolute value $|\alpha/\delta T|$ increases from the predetermined value C, the current increase/decrease amount $\Delta I_\gamma^*$ increases (linearly increases in the example in FIG. 10B) from 0. In addition, the current increase/decrease amount $\Delta I_\gamma^*$ is set such that as the absolute value $|\alpha/\delta T|$ decreases from the predetermined value B, the current increase/decrease amount $\Delta I_\gamma^*$ decreases (linearly decreases in the example in FIG. 10B) from 0.

Figure 10C:
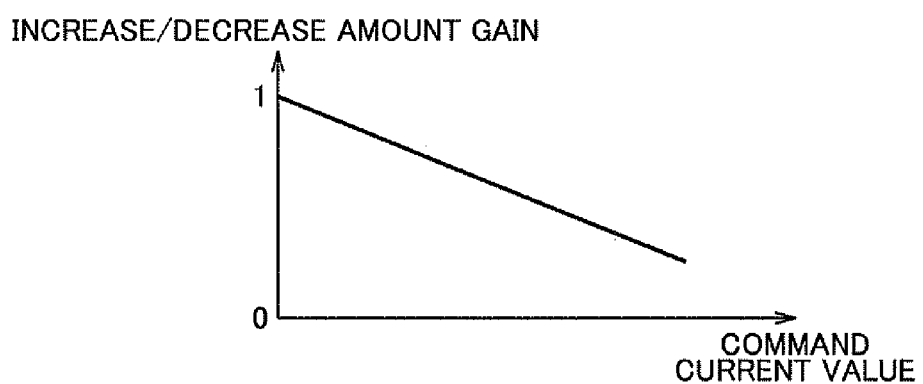
FIG. 10C is a graph showing an example of a manner of setting the increase/decrease amount gain with respect to the command current value.

The absolute value of the ratio of the addition angle α to the steering torque change amount δT (|α/δT|) decreases as the absolute value of the ratio of the steering torque change amount δT to the addition angle α (|δT/α|) increases. Therefore, the direction in which the current increase/decrease amount $\Delta I_\gamma^*$ changes with respect to the absolute value (|α/δT|) is opposite to the direction in which the current increase/decrease amount $\Delta I_\gamma^*$ changes with respect to the absolute value (|δT/α|). FIG. 10C shows an example of a manner of setting the increase/decrease amount gain G with respect to the command current value $I_\gamma$. In the example in FIG. 10C, the increase/decrease amount gain G is set so as to monotonously decrease as the present command current value $I_\gamma^*$ (immediately preceding value of the command current value $I_\gamma^*$) becomes higher. More specifically, when the present command current value $I_\gamma^*$ is 0, the increase/decrease amount gain G is set to 1. When the present command current value $I_\gamma^*$ is within a range equal to or higher than 0, the increase/decrease amount gain G is set so as to monotonously decrease (linearly decrease in the example in FIG. 10C) from 1. The reason why the increase/decrease amount gain G is set in the manner shown in FIG. 10 will be described below.

Figure 12:
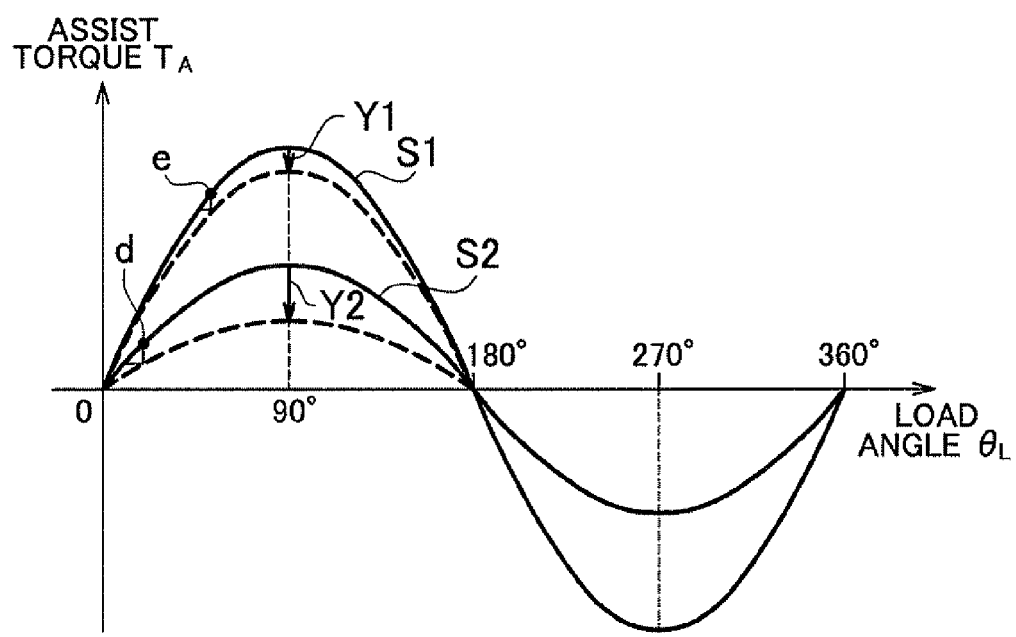
FIG. 12 is a graph for describing the function of the command current increase/decrease amount calculation unit.

FIG. 12 as well as FIG. 11 shows the relationship between the load angle $\theta_L$ and the assist torque $T_A$. In FIG. 12, the curve 51 shows the characteristic when the γ-axis current $I_\gamma$ is a relatively high value, and the curve S2 shows the characteristic when the γ-axis current $I_\gamma$ is a relatively low value. The case where the base value of the current increase/decrease amount $\Delta I_\gamma^*$ that is calculated according to the characteristic shown in FIG. 10A or FIG. 10B is a negative value, that is, the case where the command current value $I_\gamma^*$ is decreased, will be described. When the base value of the current increase/decrease amount $\Delta I_\gamma^*$ is a negative value, as described above, the absolute value |δT/α| is large (the absolute value (|α/δT|) is small), that is, the change amount $\delta T_A$ of the assist torque $T_A$ with respect to the change amount $\delta \theta_L$ of the load angle $\theta_L$ is large.

For example, when the assist torque characteristic is indicated by the curve S2 in the case where the γ-axis current $I_\gamma$ is a low value and the load angle $\theta_L$ is an angle near 0°, which corresponds to the point d on the curve S2, the absolute value |δT/α| is large. In this case, as described above, the γ-axis current $I_\gamma$ is decreased to increase the efficiency of the assist torque $T_A$ with respect to the γ-axis current $I_\gamma$. Thus, the load angle $\theta_L$ is shifted to an angle near 0°. As described above, when the γ-axis current $I_\gamma$ is low and the absolute value |δT/α| is large (for example, when the operation point is at the point d on the curve S2), if the γ-axis current $I_\gamma$ is decreased while the same magnitude of assist torque is obtained, it is possible to relatively drastically decrease the γ-axis current $I_\gamma$ as indicated by the arrow Y2 in FIG. 12.

In FIG. 12, the point on the characteristic curve S1, at which the characteristic curve S1 has the same inclination as that of the characteristic curve S2 at the point d on the curve S2 (corresponding to the absolute value |δT/α|), is e. That is, if the absolute value |δT/α| is constant, the load angle $\theta_L$ is closer to 90° when the γ-axis current $I_\gamma$ is high (point e on the curve S1) than when the γ-axis current $I_\gamma$ is low (point d on the curve S2). Therefore, when the γ-axis current $I_\gamma$ is high and the absolute value |δT/α| is large (for example, when the operation point is at the point e on the curve S1), if the γ-axis current $I_\gamma$ is decreased while the same magnitude of assist torque is obtained, the amount of decrease in the γ-axis current $I_\gamma$ is relatively small, as indicated by the arrow Y1 in FIG. 12. Therefore, when the command current value $I_\gamma^*$ is decreased to decrease the γ-axis current $I_\gamma$, preferably, the amount of decrease is made smaller as the present command current value $I_\gamma^*$ is larger.

The case where the base value of the current increase/decrease amount $\Delta I_\gamma^*$ is a positive value, that is, the case where the command current value $I_\gamma^*$ is increased will be described. When the base value of the current increase/decrease amount $\Delta I_\gamma^*$ is a positive value, as described above, the absolute value |δT/α| is small (when the absolute value |α/δT| is large), that is, the amount of change in the assist torque $T_A$ with respect to the change amount $\delta\theta_L$ of the load angle $\theta_L$ is small. That is, it is considered that the load angle $\theta_L$ is near 90° (−90°). In this case, as described above, preferably, the γ-axis current $I_\gamma$ is increased in order to increase the assist torque. However, when the γ-axis current $I_\gamma$ is already high, if the increase amount is made large, the γ-axis current $I_\gamma$ may be excessive. Therefore, when the command current value $I_\gamma^*$ is increased to increase the γ-axis current $I_\gamma$, preferably, the increase amount is made smaller as the present command current value $I_\gamma^*$ is larger. For the reason described above, the increase/decrease amount gain G is made smaller as the present command current value $I_\gamma^*$ is higher.

The final current increase/decrease amount $\Delta I_\gamma^*$ is obtained by multiplying the base value of the current increase/decrease amount $\Delta I_\gamma^*$ calculated based on the characteristic shown in FIG. 10A or FIG. 10B by the increase/decrease amount gain G obtained based on the characteristic shown in FIG. 10C. The current increase/decrease amount $\Delta I_\gamma^*$ calculated by the command current increase/decrease amount calculation unit 70A is added to the immediately preceding value $I_\gamma^*(n-1)$ (n is the number of the present calculation cycle) of the command current value $I_\gamma^*$ by the addition unit 70B ("$Z^{-1}$" indicates the immediately preceding value indicated by a signal). Thus, the command current value $I_\gamma^*$ in the present calculation cycle is calculated. Note that, the initial value of the command current value $I_\gamma^*$ is a prescribed value (e.g. 0). The command current value $I_\gamma^*$ obtained by the addition unit 70B is provided to the upper/lower limiter 70C. The upper/lower limiter 70C limits the command current value $I_\gamma^*$ obtained by the addition unit 70B to a value within a range from the predetermined lower limit $\xi_{min}$ ($\xi_{min} \geq 0$) and the predetdmined upper limit $\xi_{max}$ ($\xi_{max} > \xi_{min}$).

That is, when the command current value $I_\gamma^*$ obtained by the addition unit 70B is equal to or higher than the lower limit $\xi_{min}$ and equal to or lower than the upper limit $\xi_{max}$, the upper/lower limiter 70C outputs the command current value $I_\gamma^*$ without correction. When the command current value $I_\gamma^*$ obtained by the addition unit 70B is lower than the lower limit $\xi_{min}$, the upper/lower limiter 70C outputs the lower limit $\xi_{min}$ as the command current value $I_\gamma^*$ in the present calculation cycle. When the command current value $I_\gamma^*$ obtained by the addition unit 70B is higher than the upper limit $\xi_{max}$, the upper/lower limiter 70C outputs the upper limit $\xi_{max}$ as the command current value $I_\gamma^*$ in the present calculation cycle.

Figure 13:
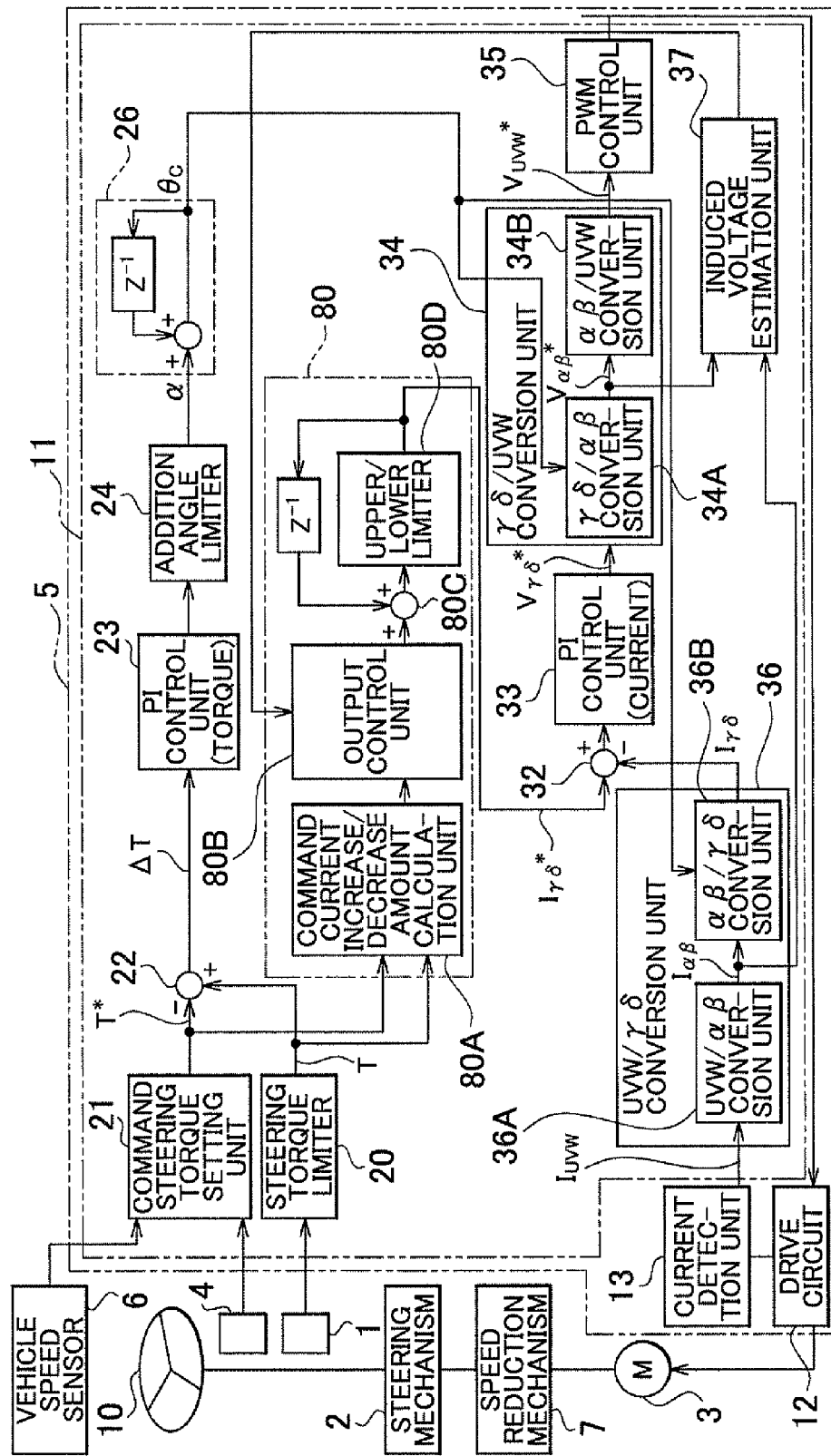
FIG. 13 is a block diagram for describing the configuration of an electric power steering system to which a motor control unit according to a fourth embodiment of the invention is applied.

FIG. 13 is a block diagram for describing the configuration of an electric power steering system to which a motor control unit according to a fourth embodiment of the invention is applied. In FIG. 13, the portions that correspond to those in FIG. 1 are denoted by the same reference numerals as those in FIG. 1. In the fourth embodiment, the microcomputer 11 further includes an induced voltage estimation unit 37 that serves as a function processing unit. Further, in the fourth embodiment, a command current value preparation unit 80 is provided instead of the command current value preparation unit 30 shown in FIG. 1. The command current value preparation unit 80 sets the γ-axis command current value $I_\gamma^*$ to a significant value, and sets the δ-axis command current value $I_\delta^*$ to 0. More specifically, the command current value preparation unit 80 sets the γ-axis command current value $I_\gamma^*$ based on the command steering torque T* that is set by the command steering torque setting unit 21, the detected steering torque T that is detected by the torque sensor 1, and the estimated induced voltage $\hat{E}_{\alpha\beta}$ estimated by the induced voltage estimation unit 37.

The UVW/γδ conversion unit 36 is formed of a UVW/αβ conversion unit 36A and an αβ/γδ conversion unit 36B. The UVW/αβ conversion unit 36A converts the three-phase detected current $I_{UVW}$ (U-phase detected current $I_U$, V-phase detected current $I_V$ and W-phase detected current $I_W$) of the UVW coordinate system, which is detected by the current detection unit 13, into the two-phase detected current $I_\alpha$ and $I_\beta$ (hereinafter, collectively referred to as "two-phase detected current $I_{\alpha\beta}$" where appropriate) of the αβ coordinate system that is the two-phase fixed coordinate system. As shown in FIG. 2, the αβ coordinate system is a fixed coordinate system where the α-axis and the β-axis (which coincides with the U-axis in the example in FIG. 2) that is perpendicular to the α-axis are defined within the rotary plane of the rotor 50 using the rotation center of the rotor 50 as the original point.

The αβ/γδ conversion unit 36B converts the two-phase detected current $I_{\alpha\beta}$ into the two-phase detected currents $I_\gamma$ and $I_\delta$ (hereinafter, correctively referred to as "two-phase detected current $I_{\gamma\delta}$" where appropriate) of the γδ coordinate system. The two-phase detected currents $I_\gamma$ and $I_\delta$ are provided to the current deviation calculation unit 32. The control angle $\theta_C$ calculated by the control angle calculation unit 26 is used for the coordinate conversion executed by the αβ/γδ conversion unit 36B. The γδ/UVW conversion unit 34 is formed of a γδ/αβ conversion unit 34A and an αβ/UVW conversion unit 34B. The γδ/αβ conversion unit 34A converts the two-phase command voltage $V_{\gamma\delta}^*$ output from the PI control unit 33 into the two-phase command voltage $V_{\alpha\beta}^*$ of the αβ coordinate system. The control angle $\theta_C$ calculated by the control angle calculation unit 26 is used for this coordinate conversion. The two-phase command voltage $V_{\alpha\beta}^*$ is formed of the α-axis command voltage $V_\alpha^*$ and the β-axis command voltage $V_\beta^*$. The αβ/UVW conversion unit 34B executes coordinate conversion calculation on the two-phase command voltage $V_{\alpha\beta}^*$ thereby preparing the three-phase command voltage $V_{UVW}^*$. The three-phase command voltage $V_{UVW}^*$ is formed of the U-phase command voltage $V_U^*$, the V-phase command voltage $V_V^*$ and the W-phase command voltage $V_W^*$. The three-phase command voltage $U_{UVW}^*$ is provided to the PWM control unit 35

Figure 14:
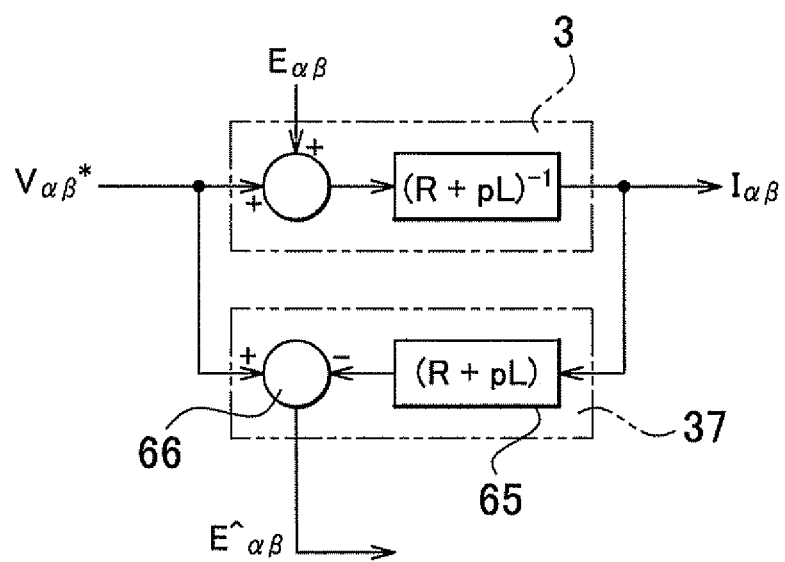
FIG. 14 is a block diagram for describing the configuration of an induced voltage estimation unit.

The induced voltage estimation unit 37 estimates the inducted voltage generated by the rotation of the motor 3. FIG. 14 is a block diagram for describing the configuration of the induced voltage estimation unit 37. The induced voltage estimation unit 37 estimates the induced voltage of the motor 3 based on the two-phase detected current $I_{\alpha\beta}$ and the two-phase command voltage $V_{\alpha\beta}^*$. More specifically, the induced voltage estimation unit 37 is formed as a disturbance observer that estimates the induced voltage of the motor 3 as a disturbance based on a motor model that is a mathematical model of the motor 3. The motor model may be expressed by, for example, $(R+pL)^{-1}$. Note that R is an armature coil resistance, L is an αβ-axis inductance, and p is a differential operator. It is considered that the two-phase command voltage $V_{\alpha\beta}^*$ and the induced voltage $E_{\alpha\beta}$ (α-axis induced voltage $E_\alpha$ and the β-axis induced voltage $E_\beta$) are applied to the motor 3.

The induced voltage estimation unit 37 is formed of an inverse motor model (inverse model of the motor model) 65 that estimates the motor voltage using the two-phase detected current $I_{\alpha\beta}$ as an input, and a voltage deviation calculation unit 66 that obtains the deviation of the motor voltage that is estimated by the inverse motor model 65 from the two-phase command voltage $V_{\alpha\beta}^*$. The voltage deviation calculation unit 66 obtains the disturbance to the two-phase command voltage $V_{\alpha\beta}^*$. As is clear from FIG. 14, the disturbance is the estimated value $\hat{E}_{\alpha\beta}$ (α-axis induced voltage estimated value $\hat{E}_\alpha$ and the β-axis induced voltage estimated value $\hat{E}_\beta$ (hereinafter, collectively referred to as "estimated induced voltage $\hat{E}_{\alpha\beta}$")) corresponding to the induced voltage $E_{\alpha\beta}$. The inverse motor model 65 is expressed by, for example, R+pL.

The command current value preparation unit 80 includes a command current increase/decrease amount calculation unit 80A, an output control unit 80B, an addition unit 80C, and an upper/lower limiter 80D. The command current increase/decrease amount calculation unit 80A calculates the current increase/decrease amount $\Delta I_\gamma^*$ for the command current value $I_\gamma^*$ based on the command steering torque T* and the detected steering torque T in predetermined calculation cycles. More specifically, the command current increase/decrease amount calculation unit 80A calculates the current increase/decrease amount $\Delta I_\gamma^*$ based on the sign of the command steering torque T* and the deviation $\Delta T$ (=T–T*) of the detected steering torque T from the command steering torque T*.

The basic concept of a method of calculating the current increase/decrease amount $\Delta I_\gamma^*$ using the command current increase/decrease amount calculation unit 80A will be described. When the absolute value of the torque deviation $\Delta T$ is larger than the predetermined value E (E>0, see FIGS. 15A and 15B) and the absolute value of the detected steering torque T is larger than the absolute value of the command steering torque T*, the command current value $I_\gamma^*$ is set to a value higher than 0 in order to fill up a deficiency in the assist torque. That is, the command current increase/decrease amount calculation unit 80A calculates the current increase/decrease amount $\Delta I_\gamma^*$ ($\Delta I_\gamma^*$>0) with which the command current value $I_\gamma^*$ is increased (hereinafter, referred to as "current increase mount" where appropriate).

On the other hand, in each of the case where the absolute value of the torque deviation $\Delta T$ is smaller than the predetermined value E and the case where the absolute value of the torque deviation $\Delta T$ is equal to or larger than the predetermined value E and the absolute value of the detected steering torque T is smaller than the absolute value of the command steering torque T*, the command current value is set to a value lower than 0 in order to suppress power consumption and generation of heat in the motor 3. That is, the command current increase/decrease amount calculation unit 80A calculates the current increase/decrease amount $\Delta I_\gamma^*$($\Delta I_\gamma^*$<0) with which the command current value $I_\gamma^*$ is decreased (hereinafter, referred to as "current decrease amount" where appropriate). The details of the command current increase/decrease amount calculation unit 80A will be described later.

If the current increase/decrease amount $\Delta I_\gamma^*$ calculated by the command current increase/decrease amount calculation unit 80A is the "current increase amount" ($\Delta I_\gamma^*$>0), the output control unit 8013 outputs this current increase/decrease amount $\Delta I_\gamma^*$. On the other hand, if the current increase/decrease amount $\Delta I_\gamma^*$ calculated by the command current increase/decrease amount calculation unit 80A is the "current decrease amount" ($\Delta I_\gamma^*$<0), the output control unit 80B outputs this current increase/decrease amount $\Delta I_\gamma^*$ only when it is determined that a time equal to or longer than the predetermined time Ts has elapsed since the command current value $I_\gamma^*$ is decreased last time and the motor 3 (rotor 50) is at a standstill (not rotating).

In other words, the output control unit 80B does not output the current increase/decrease amount $\Delta I_\gamma^*$ when a time equal to or longer than the predetermined time Ts has not elapsed since the command current value $I_\gamma^*$ is decreased last time or the motor 3 is rotating. The predetermined time Ts is a minimum cycle when the command current value $I_\gamma^*$ is successively decreased. In this embodiment, it is determined whether the motor 3 is at a standstill based on the estimated induced voltage $\hat{E}_{\alpha\beta}$ that is estimated by the induced voltage estimation unit 37. More specifically, when the square sum $(\hat{E}_\alpha^2+\hat{E}_\beta^2)$ of the α-axis induced voltage $\hat{E}_\alpha$ and the β-axis induced voltage $\hat{E}_\beta$ is equal to or smaller than the predetermined threshold H, the output control unit 80I3 determines that the motor 3 is at a standstill. On the other hand, when the square sum $(\hat{E}_\alpha^2+\hat{E}_\beta^2)$ is larger than the threshold H, the output control unit 80B determines that the motor 3 is rotating. The threshold H is set to a value that is larger than an estimated error of the square sum $(\hat{E}_\alpha^2+\hat{E}_\beta^2)$.

The predetermined time Ts is set as follows. If the command current value $I_\gamma^*$ is decreased, the load angle $\theta_L$ is controlled such that the same magnitude of assist torque (motor torque) is generated. The predetermined time Ts is set to the maximum value of the time that is required to bring the load angle $\theta_L$ to the angle at which the same magnitude of assist torque is generated, from when the command current value $I_\gamma^*$ is decreased. The maximum value Ts is set to, for example, the maximum value of the permissible time during which continuation of inappropriate assist torque is permitted (hereinafter, referred to as "maximum permissible time for inappropriate state"). The "maximum permissible time for inappropriate state" is set to, for example, 100 ms.

After the command current value $I_\gamma^*$ is decreased, if the command current value $I_\gamma^*$ is further decreased before the load angle $\theta_L$ is brought to the angle at which the same magnitude of assist torque is generated, there is a possibility that the load angle $\theta_L$ is not brought to an appropriate value. Therefore, in this embodiment if the time equal to or longer than the predetermined time Ts has not elapsed since the command current value $I_\gamma^*$ is decreased last time, the current increase/decrease amount $\Delta I_\gamma^*$ with which the command current value $I_\gamma^*$ is decreased is not output.

If the driver takes his/her hands off the steering wheel 10 while the motor 3 (steering wheel 10) is rotating, the command current value $I_\gamma^*$ may be excessively decreased because the absolute value of the detected steering torque T decreases. Then, there arises a possibility that the required assist torque is not obtained. In order to avoid occurrence of such a situation, in this embodiment, the current increase/decrease amount $\Delta I_\gamma^*$ is not output when the motor 3 (steering wheel 10) is rotating.

Figure 15A:
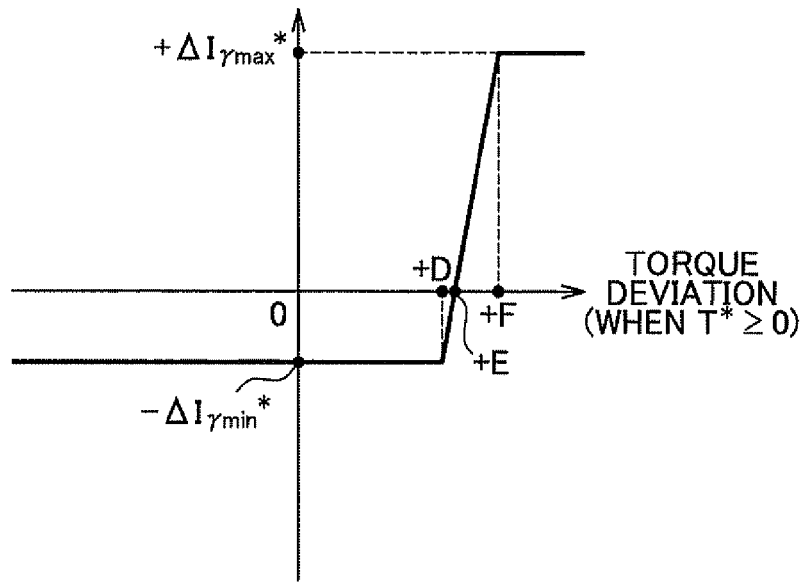
FIG. 15A is a graph showing an example of a manner of setting the current increase/decrease amount with respect to the torque deviation when the sign of the command steering torque is the positive sign.

The command current increase/decrease amount calculation unit 80A will be described in detail. FIG. 15A shows an example of a manner of setting the current increase/decrease amount $\Delta I_\gamma^*$ with respect to the torque deviation $\Delta T$ when the sign of the command steering torque T* is the positive sign (T*≥0). When the torque deviation $\Delta T$ is equal to the predetermined value +E (E>0), the current increase/decrease amount $\Delta I_\gamma^*$ is set to 0. The predetermined value E is set to a value corresponding to the variation of the output from the torque sensor 1 (maximum value of a detected error due to the variation). When the torque deviation $\Delta T$ is equal to or larger than the predetermined value +F (F>0) that is larger than the predetermined value +E, the current increase/decrease amount $\Delta I_\gamma^*$ is fixed to the maximum value +$\Delta I_{\gamma max}^*$ that is larger than 0 ($\Delta I_{\gamma max}^*$>0). The predetermined value F is set to, for example, 2 Nm. When the torque deviation $\Delta T$ is between the predetermined value E and the predetermined value F, the current increase/decrease amount $\Delta I_\gamma^*$ is set to increase (linearly increase in the example in FIG. 15A) within a range from 0 to the maximum value +$\Delta I_{\gamma max}^*$ as the torque deviation $\Delta T$ increases.

When the torque deviation $\Delta T$ is equal to smaller than the predetermined value +D (D>0) that is smaller than the predetermined value +E, the current increase/decrease amount $\Delta I_\gamma^*$ is fixed to the minimum value −$\Delta I_{\gamma min}^*$ that is smaller than 0 ($\Delta I_{\gamma min}^*$>0). When the torque deviation $\Delta T$ is between the predetermined value +E and the predetermined value +D, the current increase/decrease amount $\Delta I_\gamma^*$ is set to decrease (linearly decrease in the example in FIG. 15A) within a range from 0 to the minimum value −$\Delta I_{\gamma min}^*$ as the torque deviation $\Delta T$ decreases.

The absolute value $\Delta I_{\gamma max}^*$ of the maximum value +$\Delta I_{\gamma max}^*$ of the current increase/decrease amount $\Delta I_\gamma^*$ is the maximum value of the "current increase amount". The maximum value +$\Delta I_{\gamma max}^*$ is set to such a value that the command current value $I_\gamma^*$ reaches the command current upper limit (upper limit for the upper/lower limiter 80D) within the "maximum permissible time for inappropriate state (100 ms in this example)" if the current increase/decrease amount $\Delta I_\gamma^*$ is set to the maximum value +$\Delta I_{\gamma max}^*$. More specifically, the calculation cycle of the calculation of the current increase/decrease amount $\Delta I_\gamma^*$, executed by the command current increase/decrease amount calculation unit 80A, is set to a value shorter than the "maximum permissible time for inappropriate state (100 ms in this example)". The maximum value +$\Delta I_{\gamma max}^*$ is set to such a value that the command current value $I_\gamma^*$ reaches the upper limit of the command current if the maximum value +$\Delta I_{\gamma max}^*$ is calculated as the current increase/decrease amount $\Delta I_\gamma^*$ over the time corresponding to the "maximum permissible time for inappropriate state (100 ms in this example)" starting from the state where the command current value $I_\gamma^*$ is the lower limit (lower limit for the upper/lower limiter 80D).

Thus, when the torque deviation $\Delta T$ is equal to or larger than the predetermined value +F, it is possible to increase the command current value $_\gamma^*$ to the upper limit within the "maximum permissible time for inappropriate state (100 ms in this example)". If the "current increase amount" is changed from 0 to the maximum value +$\Delta I_{\gamma max}^*$, the assist torque is abruptly changed, which is not preferable. Therefore, when the torque deviation $\Delta T$ is equal to or larger than the predetermined value +E and equal to or smaller than the predetermined value +F (when the amount of deficiency in the assist torque is small), the "current increase amount" is gradually increased from 0 to the maximum value +$\Delta I_{\gamma max}^*$. Thus, when the torque deviation $\Delta T$ is equal to or larger than the predetermined value +E and equal to or smaller than the predetermined value +F, there is a possibility that the command current value $I_\gamma^*$ is not increased to the upper limit within the "maximum permissible time for inappropriate state". However, it is considered that no problem occurs because the amount of deficiency in the assist torque (torque deviation $\Delta T$) is small.

The absolute value $\Delta I_{\gamma min}^*$ of the minimum value −$\Delta I_{\gamma min}^*$ of the current increase/decrease amount $\Delta I_\gamma^*$ is the maximum value of the "current decrease amount". The absolute value $\Delta I_{\gamma min}^*$ is set to such a value that the corresponding assist torque change amount is equal to or smaller than the predetermined value (e.g. 2 Nm) and the time that is required to bring the load angle $\theta_L$ to the angle at which the same magnitude of assist torque is generated after the command current value $I_\gamma^*$ is decreased is equal to or shorter than the "maximum permissible time for inappropriate state (100 ms in this example)".

In the case where the sign of the command steering torque T* is the positive sign (T*≥0), when the torque deviation ΔT (T−T*) is smaller than 0, the absolute value of the detected steering torque T is smaller than the absolute value of the command steering torque T*. In this case, it is considered that the assist torque is not insufficient. However, in the case where there are variations in the output from the torque sensor 1, when the maximum value of the detection error due to the variation is set to the value E, even if the actual torque deviation ΔT is 0, the calculated torque deviation ΔT may be a value within the range from the predetermined value −E to the predetermined value +E.

Therefore, when there is a possibility that the actual torque deviation ΔT is 0, that is, when the calculated torque deviation ΔT is within the range from the predetermined value −E to the predetermined value +E, the command current value $I_\gamma^*$ is decreased in order to suppress power consumption and generation of heat in the motor 3. When the calculated torque deviation ΔT is smaller than the predetermined value −E, the current increase/decrease amount $\Delta I_\gamma^*$ is set to a negative value in order to suppress power consumption and generation of heat in the motor 3. More specifically, when the torque deviation ΔT is a value between the predetermined value +E and the predetermined value +D, the current increase/decrease amount $\Delta I_\gamma^*$ decreases (current decrease amount increases) as the torque deviation ΔT decreases. Also, when the torque deviation ΔT is a value equal to or smaller than the predetermined value +D, the current increase/decrease amount $\Delta I_\gamma^*$ is set to the minimum value $-\Delta I_{\gamma min}^*$ (the maximum value of the "current decrease amount").

On the other hand, in the case where the sign of the command steering torque T* is the positive sign (T*≥0), when the torque deviation ΔT is equal to or larger than 0, the absolute value of the detected steering torque T is larger than the absolute value of the command steering torque T*. Accordingly, in this case, it is considered that the motor torque (assist torque) is insufficient. Therefore, when the torque deviation ΔT is larger than the predetermined value +E, the current increase/decrease amount $\Delta I_\gamma^*$ is set to a positive value in order to fill up a deficiency in the assist torque. More specifically, when the torque deviation ΔT is between the predetermined value +E and the predetermined value +F, the current increase/decrease amount $\Delta I_\gamma^*$ increases ("current increase amount" increases) as the torque deviation ΔT increases. When the torque deviation ΔT is a value equal to or larger than the predetermined value +F, the current increase/decrease amount $\Delta I_\gamma^*$ is set to the maximum value $+\Delta I_{\gamma max}^*$ (the maximum value of the "current increase amount").

Figure 15B:
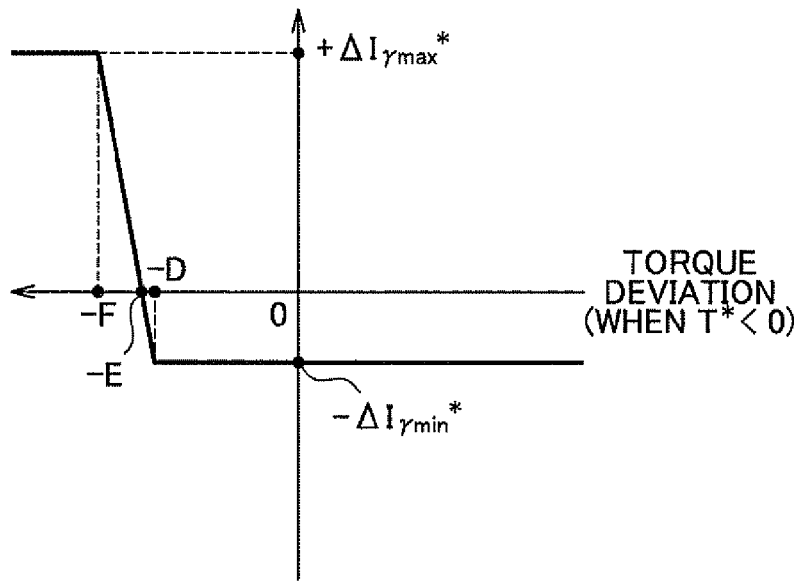
FIG. 15B is a graph showing an example of a manner of setting the current increase/decrease amount with respect to the torque deviation when the sign of the command steering torque is the negative sign.

FIG. 15B shows an example of a manner of setting the current increase/decrease amount $\Delta I_\gamma^*$ with respect to the torque deviation ΔT when the sign of the command steering torque T* is the negative sign (T*<0). When the torque deviation ΔT is equal to the predetermined value −E, the current increase/decrease amount $\Delta I_\gamma^*$ is set to 0. When the torque deviation ΔT is equal to or smaller than the predetermined value that is smaller than the predetermined value −E, the current increase/decrease amount $\Delta I_\gamma^*$ is fixed to the maximum value $+\Delta I_{\gamma max}^*$ that is larger than 0 ($\Delta I_{\gamma max}^* > 0$). When the torque deviation ΔT is between the predetermined value −E and the predetermined value −F, the current increase/decrease amount $\Delta I_\gamma^*$ is set such that the current increase/decrease amount $\Delta I_\gamma^*$ increases (linearly increases in the example in FIG. 15B) within the range from 0 to the maximum value $+\Delta I_{\gamma max}^*$ as the torque deviation ΔT decreases.

When the torque deviation ΔT is equal to or larger than the predetermined value −D that is larger than the predetermined value −E, the current increase/decrease amount $\Delta I_\gamma^*$ is fixed to the minimum value $-\Delta I_\gamma^*$ that is smaller than 0 ($\Delta I_\gamma^* > 0$). When the torque deviation ΔT is between the predetermined value −E and the predetermined value −D, the current increase/decrease amount $\Delta I_\gamma^*$ is set such that the current increase/decrease amount $\Delta I_\gamma^*$ decreases (linearly decreases in the example in FIG. 5B) within the range from 0 to the minimum value as the torque deviation ΔT increases.

In the case where the sign of the command steering torque T* is the negative sign (T*<0), when the torque deviation ΔT (=T−T*) is larger than 0, the absolute value of the detected steering torque T is smaller than the absolute value of the command steering torque T*. Accordingly, in this case, it is considered that the assist torque is not insufficient. However, in the case where there are variations in the output from the torque sensor 1, when the maximum value of the detection error due to the variation is set to the value E, even if the actual torque deviation ΔT is 0, the calculated torque deviation ΔT may be a value within the range from the predetermined value −E to the predetermined value +E. Therefore, when there is a possibility that the actual torque deviation ΔT is 0, that is, when the calculated torque deviation ΔT is within the range from the predetermined value −E to the predetetinined value +E, the command current value $I_\gamma^*$ is decreased in order to suppress power consumption and generation of heat in the motor 3.

Also, when the calculated torque deviation ΔT is larger than the predetermined value −E, the current increase/decrease amount $\Delta I_\gamma^*$ is set to a negative value in order to suppress power consumption and generation of heat in the motor 3. More specifically, when the torque deviation ΔT is a value between the predetermined value −E and the predetermined value +D, the current increase/decrease amount $\Delta I_\gamma^*$ is decreased ("current decrease amount" is increased) as the torque deviation ΔT increases. When the torque deviation ΔT is a value equal to or larger than the predetermined value −D, the current increase/decrease amount $\Delta I_\gamma^*$ is set to the minimum value $-\Delta I_{\gamma min}^*$ ("maximum value of the "current decrease amount").

On the other hand, when the torque deviation ΔT (=T−T*) is smaller than 0, the absolute value of the detected steering torque T is larger than the absolute value of the command steering torque T*. Accordingly, in this case, it is considered that the assist torque is insufficient. Therefore, when the torque deviation ΔT is smaller than the predetermined value −E, the current increase/decrease amount $\Delta I_\gamma^*$ is set to a positive value in order to fill up a deficiency in the assist torque. More specifically, when the torque deviation ΔT is a value between the predetermined value −E and the predetermined value −F, the current increase/decrease amount $\Delta I_\gamma^*$ increases (the "current increase amount" increases) as the torque deviation ΔT decreases. When the torque deviation ΔT is a value equal to or smaller than the predetermined value −F, the current increase/decrease amount $\Delta I_\gamma^*$ is set to the maximum value $+\Delta I_{\gamma max}^*$(the maximum value of the "current increase amount").

Figure 16:
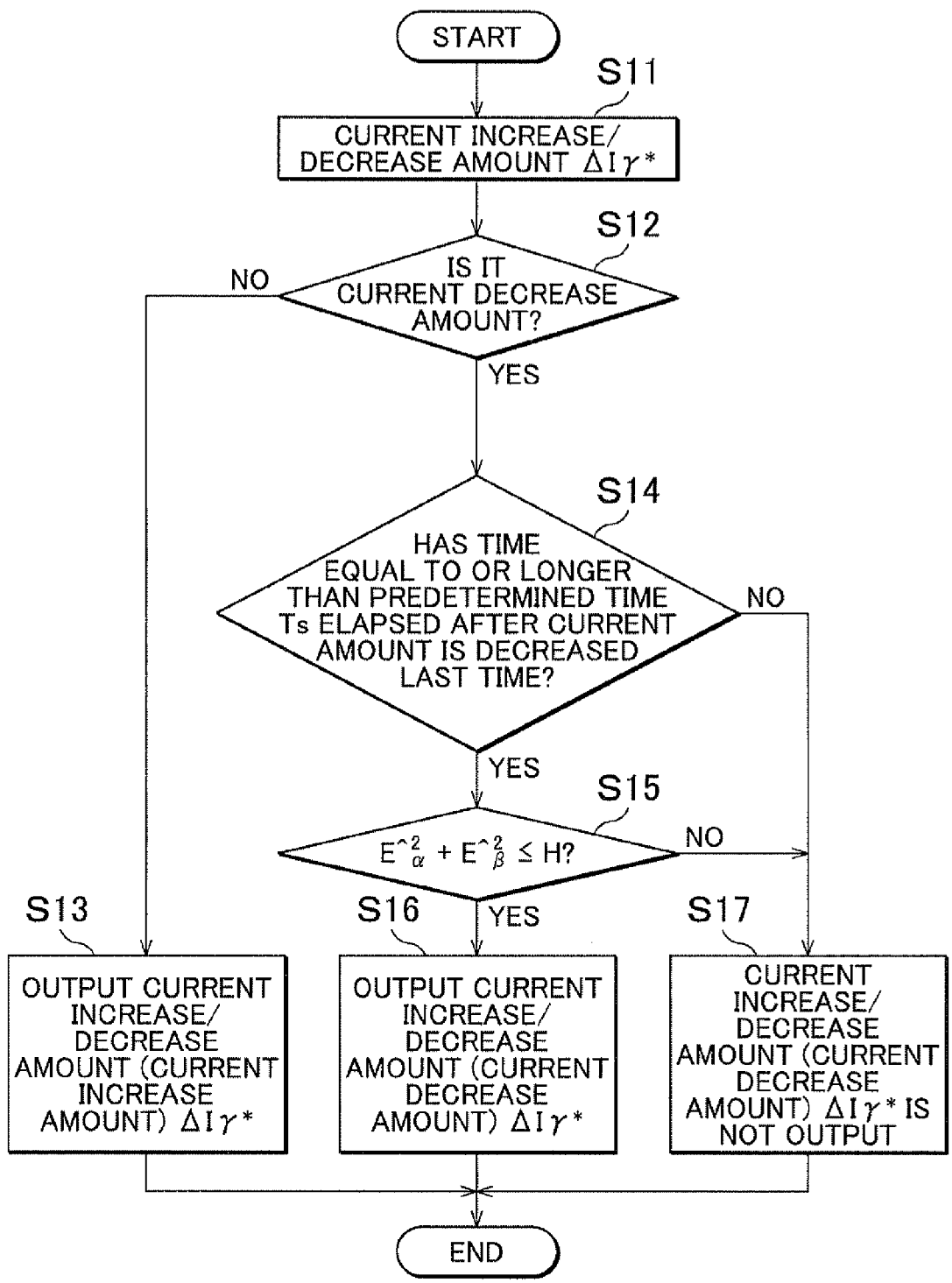
FIG. 16 is a flowchart showing the operation of a command current increase/decrease amount calculation unit and an output control unit.

The current increase/decrease amount $\Delta I_\gamma^*$ calculated by the command current increase/decrease amount calculation unit 80A is provided to the output control unit 80B. The output control unit 80B executes the above-described process. FIG. 16 is a flowchart showing the operation of the command current increase/decrease amount calculation unit 80A and the output control unit 80B. The process shown in FIG. 16 is executed in predetermined calculation cycles. When the current increase/decrease amount $\Delta I_\gamma^*$ is calculated by the command current increase/decrease amount calculation unit 80A (S11), the output control unit 80B determines whether the current increase/decrease amount $\Delta I_\gamma^*$ calculated by the command current increase/decrease amount calculation unit 80A is the "current decrease amount" (S12). More specifically, the output control unit 80B determines that the current increase/decrease amount $\Delta I_\gamma^*$ calculated in the present calculation cycle is the "current decrease amount" if the current increase/decrease amount $\Delta I_\gamma^*$ calculated by the command current increase/decrease amount calculation unit 80A is a negative value. On the other hand, if the current increase/decrease amount $\Delta I_\gamma^*$ is a positive value, the output control unit 80B determines that the current increase/decrease amount $\Delta I_\gamma^*$ calculated in the present calculation cycle is the "current increase amount".

When it is determined that the current increase/decrease amount $\Delta I_\gamma^*$ calculated by the command current increase/decrease amount calculation unit SOA is the "current increase amount" ("NO" in S12), the output control unit 8013 outputs the current increase/decrease amount $\Delta I_\gamma^*$ ("current increase amount") calculated in present calculation cycle (S13), and ends the process in the present calculation cycle. On the other hand, when it is determined that the current increase/decrease amount $\Delta I_\gamma^*$ calculated by the command current increase/decrease amount calculation unit 80A is the "current decrease amount" ("YES" in S12), the output control unit 80B determines whether a time equal to or longer than the predetermined time Ts has elapsed since the command current value $I_\gamma^*$ is decreased last time (S14). The predetermined time Ts is the minimum cycle when the command current value $I_\gamma^*$ is successively decreased, and 100 ms in this example. In S14, a determination is made, for example, by determining whether the predetermined time Ts has elapsed since the time point at which the newest "current decrease amount" is output from the output control unit 80B.

When a time equal to or longer than the predetermined time Ts has elapsed since the command current value $I_\gamma^*$ is decreased last time ("YES" in S14), it is determined whether the square sum $(\hat{E}_\alpha^2 + \hat{E}_\beta^2)$ of the estimated induced voltage $\hat{E}_{\alpha\beta}$ estimated by the induced voltage estimation unit 37 is equal to or lower than the predetermined threshold H (S15). When the square sum $(\hat{E}_\alpha^2 + \hat{E}_\beta^2)$ of the estimated induced voltage $\hat{E}_{\alpha\beta}$ is equal to or smaller than the predetermined threshold H ("YES" in S15), the output control unit 80B outputs the current increase/decrease amount $\Delta I_\gamma^*$ ("current decrease amount") calculated in the present calculation cycle (S16), and ends the process in the present calculation cycle.

When it is determined in S14 that a time that is equal to or longer than the predetermined time Ts has not elapsed since the command current value $I_\gamma^*$ is decreased last time ("NO" in S14) or when it is determined in S15 that the square sum $(\hat{E}_\alpha^2 + \hat{E}_\beta^2)$ of the estimated induced voltage $\hat{E}_{\alpha\beta}$ is equal to or larger than the threshold H ("NO" in S15), the output control unit 80B ends the process in the present calculation cycle without outputting the current increase/decrease amount $\Delta I_\gamma^*$ ("current decrease amount") calculated in the present calculation cycle (S17).

Referring again to FIG. 13, the current increase/decrease amount $\Delta I_\gamma^*$ output from the output control unit 80B is added to the immediately preceding value $I_\gamma^*(n-1)$ (n is the number of the present calculation cycle) of the command current value $I_\gamma^*$ ("$Z^{-1}$" indicates the immediately preceding value indicated by a signal) by the addition unit 80C. Thus, the command current value $I_\gamma^*$ in the present calculation cycle is calculated. Note that the initial value of the command current value $I_\gamma^*$ is a prescribed value (e.g. 0). The command current value $I_\gamma^*$ obtained by the addition unit 80C is provided to the upper/lower limiter 80D. The upper/lower limiter 80D limits the command current value $I_\gamma^*$ obtained by the addition unit 80C to a value within a range between the predetermined lower limit $\xi_{min}$ (>0) and the predetermined upper limit $\xi_{max}$ ($\xi_{max} > \xi_{min}$).

That is, when the command current value $I_\gamma^*$ obtained by the addition unit 80C is equal to or higher than the lower limit $\xi_{min}$ and equal to or lower than the upper limit $\xi_{max}$, the upper/lower limiter 80D outputs the command current value $I_\gamma^*$ without correction. When the command current value $I_\gamma^*$ obtained by the addition unit 80C is lower than the lower limit $\xi_{min}$, the upper/lower limiter 80D outputs the lower limit $\xi_{min}$ as the command current value $I_\gamma^*$ in the present calculation cycle. When the command current value $I_\gamma^*$ obtained by the addition unit 80C is higher than the upper limit $\xi_{max}$, the upper/lower limiter 80D outputs the upper limit $\xi_{max}$ as the command current value $I_\gamma^*$ in the present calculation cycle.

In the embodiment described above, whether the motor 3 is at a standstill is determined based on the square sum $(\hat{E}_\alpha^2 + \hat{E}_\beta^2)$ of the estimated induced voltage. Alternatively, whether the motor 3 is at a standstill may be determined based on the amount of change in the steering angle per unit time, which is detected by the steering angle sensor 4. More specifically, when the amount of change in the steering angle per unit time is equal to or smaller than a predetermined threshold, it is determined that the motor 3 is at a standstill. When the amount of change in the steering angle per unit time is larger than the predetermined threshold, it is determined that the motor 3 is rotating.

In the first embodiment shown in FIG. 1 and the third embodiment shown in FIG. 9, an output control similar to that executed by the output control unit 80B in the fourth embodiment may be executed on the current increase/decease amount $\Delta I_\gamma^*$ calculated by the command current increase/decrease amount calculation unit 30A and the current increase/decease amount $\Delta I_\gamma^*$ calculated by command current increase/decrease amount calculation unit 70A. That is, as indicated by broken lines in FIGS. 1 and 9, the output control unit 80B that executes an output control similar to that executed by the output control unit 80B in the fourth embodiment may be provided between the command current increase/decrease amount calculation unit 30A and the addition unit 30B and between the command current increase/decrease amount calculation unit 70A and the addition unit 70B. In this case, an induced voltage estimation unit that is similar to the induced voltage estimation unit 37 in the fourth embodiment may be provided in order to determine whether the motor 3 (rotor 50) is at a standstill. Also, whether the motor 3 is at a standstill may be determined based on the amount of change in the steering angle per unit time, which is detected by the steering angle sensor 4.

Figure 17:
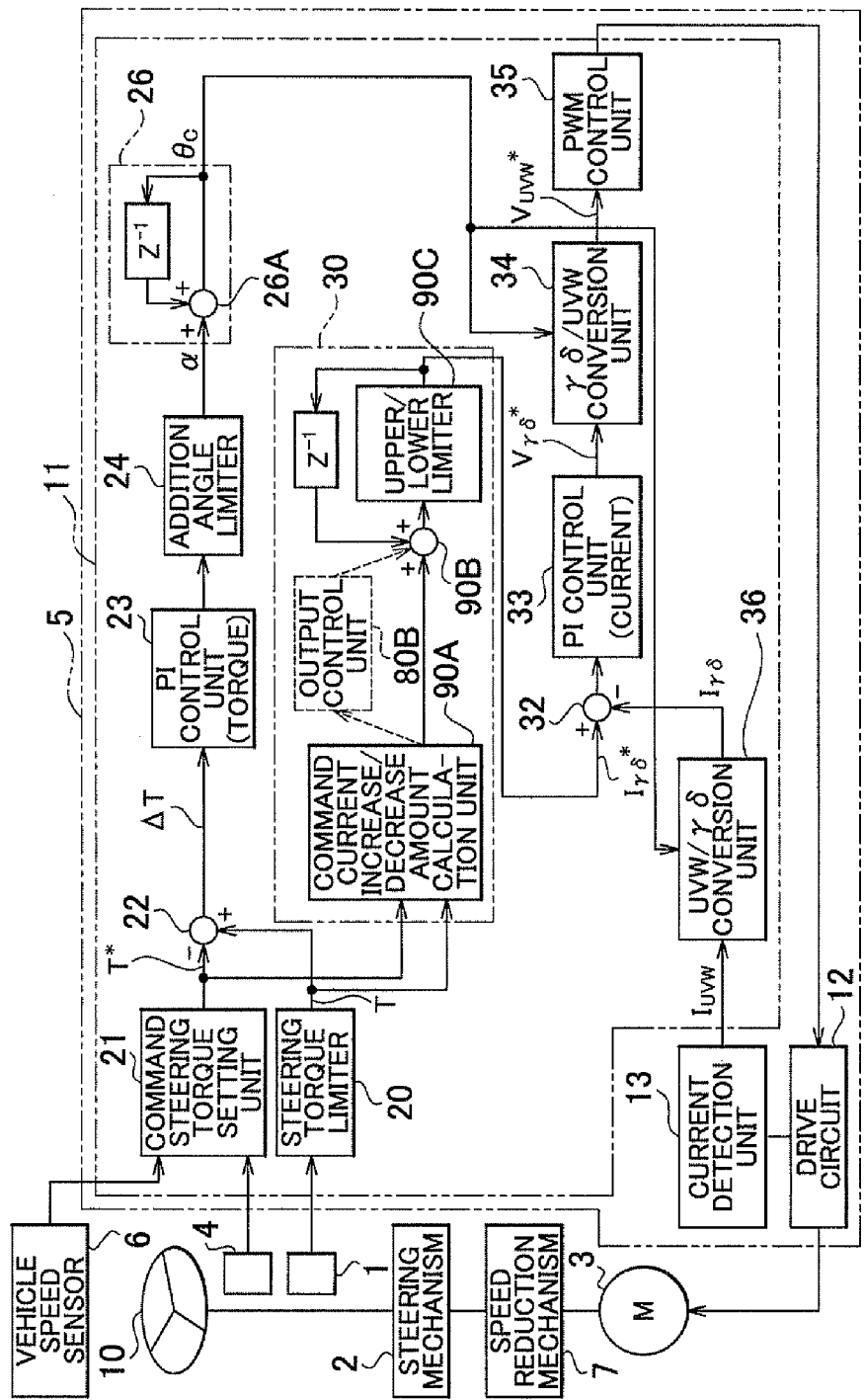
FIG. 17 is a block diagram for describing the configuration of an electric power steering system to which a motor control unit according to a fifth embodiment of the invention is applied.

FIG. 17 is a block diagram for describing the configuration of an electric power steering system to which a motor control unit according to a fifth embodiment of the invention is applied. In FIG. 17, the portions that correspond to those in FIG. 1 are denoted by the same reference numerals as those in FIG. 1. In the fourth embodiment described above (see FIG. 13), as shown in FIG. 15A, when the sign of the command steering torque T* is the positive sign (T*>0), if the torque deviation $\Delta T$ is smaller than the predetermined value E, the command current value $I_\gamma^*$ is set to a value smaller than 0 in order to suppress power consumption and generation of heat in the motor 3. In FIG. 15A, when the sign of the command steering torque T* is the positive sign (T*≥0), if the torque deviation $\Delta T$ is a negative value, the current increase/decrease amount $\Delta I_\gamma^*$ is set to the minimum value $-\Delta I_{\gamma min}^*$.

When the driver turns the steering wheel 10 in the clockwise direction and then performs a steering operation for returning the steering wheel 10 toward the neutral position, the each of the signs of the command steering torque T* and the detected steering torque T is the positive sign, and the absolute value of the detected steering torque T decreases. Therefore, the torque deviation ΔT (=T−T*) is a negative value. When the torque deviation ΔT becomes a negative value due to the steering operation for returning the steering wheel 10 toward the neutral position, the current increase/decrease amount $\Delta I_\gamma^*$ becomes the minimum value $-\Delta I_{\gamma min}^*$. Therefore, the command current value $I_\gamma^*$ may decrease and the assist torque may become equal to 0. Then, the assist torque that has been generated becomes 0, and the driver feels a sense of discomfort when performing the steering operation for returning the steering wheel 10 toward the neutral position. In the fifth embodiment, the assist torque is generated even during the steering operation for returning the steering wheel 10 toward the neutral position. Thus, the driver does not feel a sense of discomfort when performing the steering operation for returning the steering wheel 10 toward the neutral position.

In the fifth embodiment, a command current value preparation unit 90 is provided instead of the command current value preparation unit 30 shown in FIG. 1. The command current value preparation unit 90 sets the γ-axis command current value $I_\gamma^*$ to a significant value, and sets the δ-axis command current value $I_\delta^*$ to 0. More specifically, the command current value preparation unit 90 sets the γ-axis command current value $I_\gamma^*$ based on the command steering torque T* that is set by the command steering torque setting unit 21 and the detected steering torque T that is detected by the torque sensor 1.

The command current value preparation unit 90 includes a command current increase/decrease amount calculation unit 90A, an addition unit 90B and an upper/lower limiter 90C. The command current increase/decrease amount calculation unit 90A calculates the current increase/decrease amount $\Delta I_\gamma^*$ for the command current value $I_\gamma^*$ based on the command steering torque T* and the detected steering torque T in predetermined calculation cycles. More specifically, the command current increase/decrease amount calculation unit 90A calculates the current increase/decrease amount $\Delta I_\gamma^*$ based on the sign of the command steering torque T* and the deviation ΔT (=T−T*) of the detected steering torque T from the command steering torque T*.

The basic concept of a method of calculating the current increase/decrease amount $\Delta I_\gamma^*$ using the command current increase/decrease amount calculation unit 90A will be described. When the absolute value of the detected steering torque T is larger than the absolute value of the command steering torque T* and the absolute value of the torque deviation ΔT is larger than the first predetermined value E (E>0, see FIGS. 18A and 18B), the command current value $I_\gamma^*$ is set to a value higher than 0 in order to fill up a deficiency in the assist torque. That is, the command current increase/decrease amount calculation unit 90A calculates the current increase/decrease amount $\Delta I_\gamma^*$ ($\Delta I_\gamma^*>0$) with which the command current value $I_\gamma^*$ is increased (hereinafter, referred to as "current increase amount" where appropriate).

When the absolute value of the detected steering torque T is smaller than the absolute value of the command steering torque T* and the absolute value of the torque deviation ΔT is larger than the second predetermined value H (H>0: see FIGS. 18A and 18B), the command current value $I_\gamma^*$ is set to a value higher than 0 in order to generate an assist torque during the steering operation for returning the steering wheel 10 toward the neutral position. That is, the command current increase/decrease amount calculation unit 90A calculates the current increase/decrease amount $\Delta I_\gamma^*$ ($\Delta I_\gamma^*>0$) with which the command current value $I_\gamma^*$ is increased ("current increase amount").

In each of the case where the absolute value of the detected steering torque T is larger than the absolute value of the command steering torque T* and the absolute value of the torque deviation ΔT is equal to or smaller than the first predetermined value E and the case where the absolute value of the detected steering torque T is smaller than the absolute value of the command steering torque T* and the absolute value of the torque deviation ΔT is equal to or smaller than the second predetermined value H, the command current value $I_\gamma^*$ is set to a value lower than 0 in order to suppress power consumption and generation of heat in the motor 3. That is, the command current increase/decrease amount calculation unit 90A calculates the current increase/decrease amount $\Delta I_\gamma^*$ ($\Delta I_\gamma^*<0$) with which the command current value $I_\gamma^*$ is decreased ("current decrease amount").

Figure 18A:
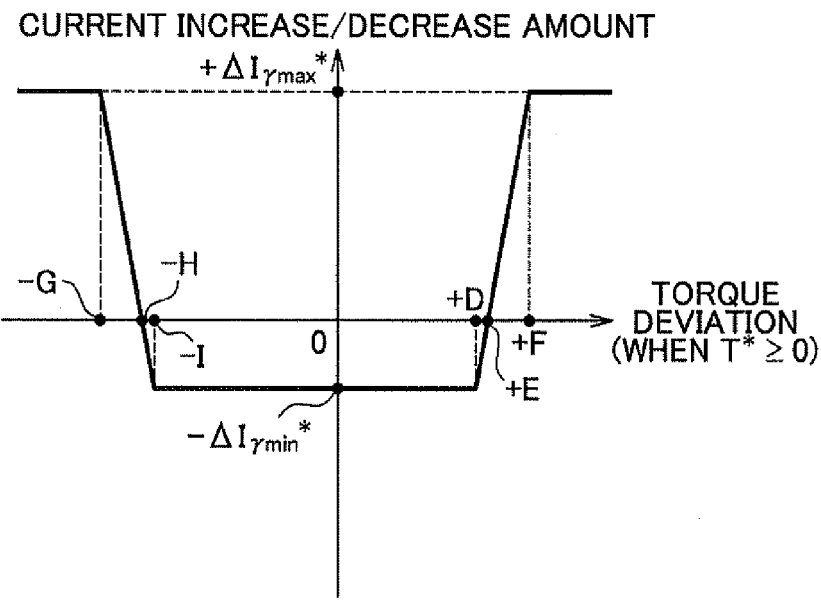
FIG. 18A is a graph showing an example of a manner of setting the current increase/decrease amount with respect to the torque deviation when the sign of the command steering torque is the positive sign.

FIG. 18A shows an example of a manner of setting the current increase/decrease amount $\Delta I_\gamma^*$ with respect to the torque deviation ΔT when the sign of the command steering torque T* is the positive sign (T*≥0). When the torque deviation ΔT is equal to the predetermined value +E (E>0: first predetermined value E) or the predetermined value −H (H>0: value obtained by assigning the negative sign to the second predetermined value H), the current increase/decrease amount $\Delta I_\gamma^*$ is set to 0. The first predetermined value E is set to a value corresponding to the variation in the output from the torque sensor 1 (maximum value of a detection error due to variation). When the torque deviation ΔT is equal to or larger than the predetermined value +F (F>0) that is larger than the predetermined value +E, the current increase/decrease amount $\Delta I_\gamma^*$ is fixed to the maximum value $+\Delta I_{\gamma max}^*$ that is larger than 0 ($\Delta I_{\gamma max}^*>0$). The predetermined value +F is set to, for example, 2 Nm. When the torque deviation ΔT is between the predetermined value +E and the predetermined value +F, the current increase/decrease amount $\Delta I_\gamma^*$ is set such that the current increase/decrease amount $\Delta I_\gamma^*$ increases (linearly increases in the example in FIG. 18A) within the range from 0 to the maximum value $+\Delta I_{\gamma max}^*$ as the torque deviation ΔT increases.

The absolute value of the predetermined value −H (second predetermined value H) is set to a value equal to or larger than the first predetermined value E. The second predetermined value H is set to, for example, a value within a range from 2 Nm to 3 Nm. When the driver turns the steering wheel 10 in the clockwise direction and then performs the steering operation for returning the steering wheel 10 toward the neutral position, the absolute value of the detected steering torque T is decreased and the torque deviation ΔT becomes a negative value. In this embodiment, when the torque deviation ΔT is smaller than the predetermined value −H that is equal to or smaller than the predetermined value −E, it is determined that the operation for returning the steering wheel 10 toward the neutral position is performed, in consideration of the maximum value E in a detection error due to variations in the output from the torque sensor 1.

When the torque deviation ΔT is equal to or smaller than the predetermined value −G (G>0) that is smaller than the predetermined value −H, the current increase/decrease amount $\Delta I_\gamma^*$ is fixed to the maximum value $+\Delta I_{\gamma max}^*$ ($\Delta I_{\gamma max}^*>0$) that is larger than 0. The predetermined value G is set to, for example, 5 Nm. When the torque deviation ΔT is between the predetermined value −H and the predetermined value −G, the current increase/decrease amount $\Delta I_\gamma^*$ is set such that the current increase/decrease amount $\Delta I_\gamma^*$ increases (linearly increases in the example in FIG. 18A) within the range from 0 to the maximum value $+\Delta I_{\gamma max}^*$ as the torque deviation $\Delta$ decreases.

When the torque deviation $\Delta T$ is within the range equal to or larger than $-I$ ($I>0$) that is larger than the predetermined value $-H$ and equal to or smaller than the predetermined value $+D$ ($D>0$) that is smaller than the predetermined value $+E$, the current increase/decrease amount $\Delta I_\gamma^*$ is fixed to the minimum value $-\Delta I_{\gamma min}^*$ ($\Delta I_{\gamma min}^*>0$) that is smaller than 0. When the torque deviation $\Delta T$ is between the predetermined value $-H$ and the predetermined value $-I$, the current increase/decrease amount $\Delta I_\gamma^*$ is set such that the current increase/decrease amount $\Delta I_\gamma^*$ decreases (linearly decreases in the example in FIG. 18A) within the range from 0 to the minimum value $-\Delta I_{\gamma min}^*$ as the torque deviation $\Delta T$ increases. When the torque deviation $\Delta T$ is between the predetermined value $+E$ and the predetermined value $+D$, the current increase/decrease amount $\Delta I_\gamma^*$ is set such that the current increase/decrease amount $\Delta I_\gamma^*$ decreases (linearly decreases in the example in FIG. 18A) within the range from 0 to the minimum value $-\Delta I_{\gamma min}^*$ as the torque deviation $\Delta T$ decreases.

The absolute value $\Delta I_{\gamma max}^*$ of the maximum value $+\Delta I_{\gamma max}^*$ of the current increase/decrease amount $\Delta I_\gamma^*$ is the maximum value of the "current increase amount". The maximum value $+\Delta I_{\gamma max}^*$ may be set to such a value that the command current value $I_\gamma^*$ reaches the command current upper limit (upper limit for the upper/lower limiter 80D) within the "maximum permissible time for inappropriate state (100 ms in this example)" when the current increase/decrease amount $\Delta I_\gamma^*$ is set to the maximum value $+\Delta I_{\gamma max}^*$.

The absolute value $\Delta I_{\gamma min}^*$ of the minimum value $+\Delta I_{\gamma min}^*$ of the current increase/decrease amount $\Delta I_\gamma^*$ is the maximum value of the "current decrease amount". The absolute value $\Delta I_{\gamma min}^*$ may be set to such a value that the corresponding assist torque change amount is equal to or smaller than the predetermined value (e.g. 2 Nm) and the time required to bring the load angle $\theta_L$ to the angle at which the same magnitude of assist torque is generated after the command current value $I_\gamma^*$ is decreased is equal to or shorter than the "maximum permissible time for inappropriate state (100 ms in this example)".

In the case where the sign of the command steering torque $T^*$ is the positive sign ($T^* \geq 0$), when the torque deviation $\Delta T$ ($=T-T^*$) is equal to or larger than 0, the absolute value of the detected steering torque T is larger than the absolute value of the command steering torque $T^*$, and therefore, it is considered that the assist torque is insufficient. Accordingly, when the torque deviation $\Delta T$ is larger than the predetermined value $+E$, the current increase/decrease amount $\Delta I_\gamma^*$ is set to a positive value in order to fill up a deficiency in the assist torque.

As described above, when the driver turns the steering wheel 10 in the clockwise direction and then performs the steering operation for returning the steering wheel 10 toward the neutral position, the absolute value of the detected steering torque T decreases, and therefore, the torque deviation $\Delta T$ ($T-T^*$) becomes smaller than 0. Therefore, when the torque deviation $\Delta T$ becomes smaller than the predetermined value $-H$, the current increase/decrease amount $\Delta I_\gamma^*$ is set to a positive value in order to generate the assist torque during the operation for returning the steering wheel 10 toward the neutral position. Thus, it is possible to perform the operation for returning the steering wheel 10 toward the neutral position without a sense of discomfort.

Figure 18B:
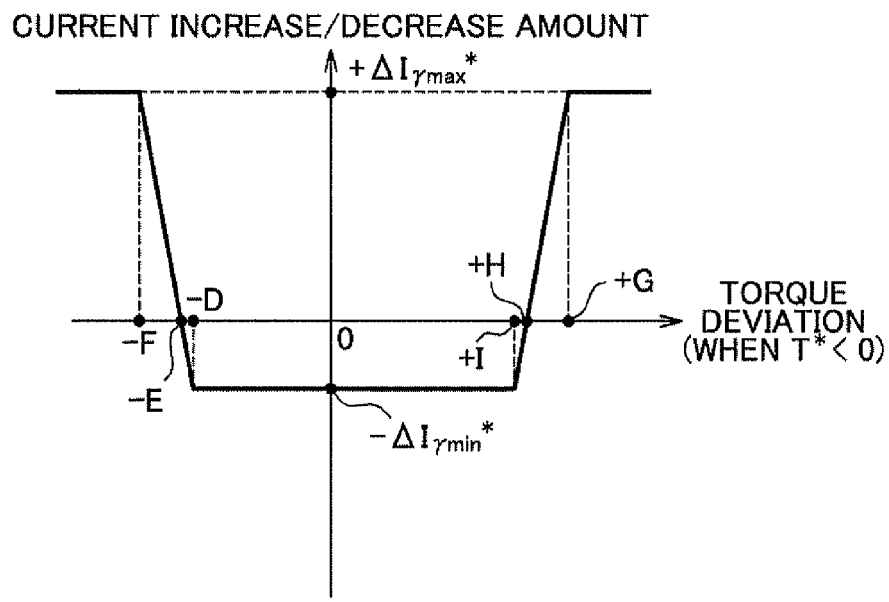
FIG. 18B is a graph showing an example of a manner of setting the current increase/decrease amount with respect to the torque deviation when the sign of the command steering torque is the negative sign.

When the torque deviation $\Delta T$ is equal to or larger than the predetermined value $-H$ and equal to or smaller than the predetermined value $+E$, the current increase/decrease amount $\Delta I_\gamma^*$ is set to a negative value in order to suppress power consumption and generation of heat in the motor 3. FIG. 18B shows an example of a manner of setting the current increase/decrease amount $\Delta I_\gamma^*$ with respect to the torque deviation $\Delta T$ when the sign of the command steering torque $T^*$ is the negative sign ($T^*<0$). When the torque deviation $\Delta T$ is equal to the predetermined value $-E$ or the predetermined value $+H$, the current increase/decrease amount $\Delta I_\gamma^*$ is set to 0. When the torque deviation $\Delta T$ is equal to or smaller than the predetermined value $-F$ that is smaller than the predetermined value $-E$, the current increase/decrease amount $\Delta I_\gamma^*$ is fixed to the maximum value $+\Delta I_{\gamma max}^*$ ($\Delta I_{\gamma max}^*>0$) that is larger than 0. When the torque deviation $\Delta T$ is between the predetermined value $-E$ and the predetermined value $-F$, the current increase/decrease amount $\Delta I_\gamma^*$ is set such that the current increase/decrease amount $\Delta I_\gamma^*$ increases (linearly increases in the example in FIG. 18B) within the range from 0 to the maximum value $+\Delta I_{\gamma max}^*$ as the torque deviation $\Delta T$ decreases.

When the driver turns the steering wheel 10 in the counterclockwise direction and then performs the steering operation for returning the steering wheel 10 toward the neutral position, the absolute value of the detected steering torque T decreases and, therefore, the torque deviation $\Delta T$ ($=T-T^*$) becomes a positive value. In this embodiment, when the torque deviation $\Delta T$ is larger than the predetermined value $+H$ that is equal to or larger than the predetermined value $+E$, it is determined that the operation for returning the steering wheel 10 toward the neutral position is performed, in consideration of the maximum value E of a detection error due to variations in the output from the torque sensor 1.

When the torque deviation $\Delta T$ is equal to or larger than the predetermined value $+G$ that is larger than the predetermined value $+H$, the current increase/decrease amount $\Delta I_\gamma^*$ is fixed to the maximum value $+\Delta I_{\gamma max}^*$ ($\Delta I_{\gamma max}^*>0$) that is larger than 0. When the torque deviation $\Delta T$ is between the predetermined value $+H$ and the predetermined value $+G$, the current increase/decrease amount $\Delta I_\gamma^*$ is set such that the current increase/decrease amount $\Delta I_\gamma^*$ increases (linearly increases in the example in FIG. 18B) within the range from 0 to the maximum value $+\Delta I_{\gamma max}^*$ as the torque deviation $\Delta T$ increases.

When the torque deviation $\Delta T$ is within the range equal to or larger than the predetermined value $-D$ that is larger than the predetermined value $-E$ and equal to or smaller than the predetermined value $+I$ that is smaller than the predetermined value $+H$, the current increase/decrease amount $\Delta I_\gamma^*$ is fixed to the minimum value $-\Delta I_{\gamma min}^*$ ($\Delta I_{\gamma min}^*>0$) that is smaller than 0. When the torque deviation $\Delta T$ is between the predetermined value $+H$ and the predetermined value $+I$, the current increase/decrease amount $\Delta I_\gamma^*$ is set such that the current increase/decrease amount $\Delta I_\gamma^*$ decreases (linearly decreases in the example in FIG. 18B) within the range from 0 to the minimum value $-\Delta I_{\gamma min}^*$ as the torque deviation $\Delta T$ decreases. When the torque deviation $\Delta T$ is between the predetelinined value $-E$ and the predetermined value $-D$, the current increase/decrease amount $\Delta I_\gamma^*$ is set such that the current increase/decrease amount $\Delta I_\gamma^*$ decreases (linearly decreases in the example in FIG. 18B) within the range from 0 to the minimum value $-\Delta I_{\gamma min}^*$ as the torque deviation $\Delta T$ increases.

In the case where the sign of the command steering torque $T^*$ is the negative sign ($T^*<0$), when the torque deviation $\Delta T$ ($=T-T^*$) is smaller than 0, the absolute value of the detected steering torque T is larger than the absolute value of the command steering torque $T^*$ and therefore it is considered that the assist torque is not sufficient. Therefore, when the torque deviation ΔT is smaller than the predetermined value −E, the current increase/decrease amount $\Delta I_\gamma^*$ is set to a positive value so as to fill up a deficiency in the assist torque.

As described above, when the driver turns the steering wheel 10 in the counterclockwise direction and then performs the steering operation for returning the steering wheel 10 toward the neutral position, the absolute value of the detected steering torque T decreases and therefore the torque deviation ΔT (=T−T*) becomes larger than 0. Therefore, when the torque deviation ΔT becomes larger than the predetermined value +H, the current increase/decrease amount $\Delta I_\gamma^*$ is set to a positive value to generate the assist torque during the operation for returning the steering wheel 10 toward the neutral position. Thus, it is possible to perform the operation for returning the steering wheel 10 toward the neutral position without a sense of discomfort.

When the torque deviation ΔT is within the range equal to or larger than the predetermined value −E and equal to or smaller than the predetermined value +H, the current increase/decrease amount $\Delta I_\gamma^*$ is set to a negative value in order to suppress power consumption and generation of heat in the motor 3. Referring again to FIG. 17, the current increase/decrease amount $\Delta I_\gamma^*$ output from the command current increase/decrease amount calculation unit 90A is added to the immediately preceding value $I_\gamma^*(n-1)$ (n is the number of the present calculation cycle) of the command current value $I_\gamma^*$ by the addition unit 90B ("$Z^{-1}$" indicates the immediately preceding value indicated by a signal). Thus, the command current value $I_\gamma^*$ in the present calculation cycle is calculated. Note that the initial value of the command current value $I_\gamma^*$ is a prescribed value (e.g. 0). The command current value $I_\gamma$ obtained by the addition unit 90B is provided to the upper/lower limiter 90C. The upper/lower limiter 90C limits the command current value $I_\gamma$ obtained by the addition unit 90B to a value within the range between the predetermined lower limit $\xi_{min}$ ($\xi_{min}$≥0) and the predetermined upper limit $\xi_{max}$ ($\xi_{max}$>$\xi_{min}$).

That is, when the command current value $I_\gamma^*$ obtained by the addition unit 90B is equal to or higher than the lower limit $\xi_{min}$ and equal to or lower than the upper limit $\xi_{max}$, the upper/lower limiter 90C outputs the command current value without correction. When the command current value $I_\gamma^*$ obtained by the addition unit 90B is lower than the lower limit $\xi_{min}$, the upper/lower limit 90C outputs the lower limit $\xi_{min}$ as the command current value $I_\gamma^*$ in the present calculation cycle. When the command current value $I_\gamma^*$ obtained by the addition unit 90B is higher than the upper limit $\xi_{max}$, the upper/lower limiter 90C outputs the upper limit $\xi_{max}$ as the command current value $I_\gamma^*$ in the present calculation cycle.

In the fifth embodiment shown in FIG. 17 as well, an output control similar to that executed by the output control 80B in the fourth embodiment may be executed on the current increase/decrease amount $\Delta I_\gamma^*$ calculated by the command current increase/decrease amount calculation unit 90A. That is, as indicated by the broken line in FIG. 17, the output control unit 8013 that executes an output control similar to that executed by the output control unit 80B in the fourth embodiment may be provided between the command current increase/decrease amount calculation unit 90A and the addition unit 90B. In this case, an induced voltage estimation unit that is similar to the induced voltage estimation unit 37 in the fourth embodiment may be provided in order to determine whether the motor 3 (rotor 50) is at a standstill. Also, whether the motor 3 is at a standstill may be determined based on the amount of change in the steering angle per unit time, which is detected by the steering angle sensor 4. While the embodiments of the invention have been described, the invention is not limited to the above-described embodiments and may be implemented in various other embodiments. For example, in the embodiments described above, the addition angle α is obtained by the PI control unit 23. The addition angle α may be obtained by a PID (proportional-integral-differential) calculation unit instead of the PI control unit 23.

In the embodiments described above, a rotational angle sensor is not provided and the motor 3 is driven by executing the sensorless control. Alternatively, a rotational angle sensor, for example, a resolver may be provided and the above-described sensorless control may be executed when the rotational angle sensor malfunctions. Thus, even if the rotational angle sensor malfunctions, driving of the motor 3 is continued. Therefore, the steering assist operation is continued. In this case, when the rotational angle sensor is used, the δ-axis command current value $I_\delta^*$ may be prepared by the command current value preparation unit 30 based on the steering torque and the vehicle speed and according to the predetermined assist characteristics.

In the embodiments described above, the invention is applied to the electric power steering system. Alternatively, the invention may be applied to a motor control for an electric pump hydraulic power steering system. Further alternatively, the invention may be implemented in various embodiments other than a control of a motor for an electric pump hydraulic power steering system and a power steering system. For example, the invention may be applied to a steer-by-wire (SBW) system, a variable gear ratio (VGR) steering system, and a control of a brushless motor provided in another type of vehicle steering system. The motor control unit according to the invention may be used in not only a control for the vehicle steering system but also controls for motors for other use.

In addition, various design changes may be made within the scope of claims.

What is claimed is:

1. A motor control unit that controls a motor and that includes a rotor and a stator that faces the rotor, comprising:
   a current drive unit that drives the motor based on an axis current value of a rotating coordinate system that rotates in accordance with a control angle that is a rotational angle used in a control and calculated without receiving an output signal of rotational angle sensor that detects a rotation angle of the rotor so that the control angle is determined independently from the rotation angle of the rotor;
   a control angle calculation unit that obtains a present value of the control angle by adding an addition angle to an immediately preceding value of the control angle in predetermined calculation cycles;
   a torque detection unit having a torque sensor that detects a torque other than a motor torque, which is applied to a drive target that is driven by the motor;
   a command torque setting unit that sets a command torque that is a torque that is other than the motor torque and that is to be applied to the drive target;
   an addition angle calculation unit that calculates, without detecting a change of the rotation angle of the rotor, the addition angle based on a torque deviation that is a deviation of a detected torque that is detected by the torque detection unit from the command torque that is set by the command torque setting unit; and
   a command current setting unit that sets a command current value that is a target value of the axis current value based on the torque deviation,
      wherein the command current setting unit sets a present value of a command current by correcting an immediately preceding value of the command current by a correction amount that corresponds to the torque deviation, and wherein the command current setting unit includes a correction amount calculation unit that calculates the correction amount such that an absolute value of the correction amount increases as an absolute value of the torque deviation increases.

2. The motor control unit according to claim 1, wherein the command current setting unit calculates the correction amount with which the immediately preceding value of the command current is decreased, in each of a case where an absolute value of the torque deviation is smaller than a predetermined value and a case where the absolute value of the torque deviation is equal to or larger than the predetermined value and an absolute value of the detected torque is smaller than an absolute value of the command torque; and the command current setting unit calculates the correction amount with which the immediately preceding value of the command current is increased in a case where the absolute value of the torque deviation is larger than the predetermined value and the absolute value of the detected torque is larger than the absolute value of the command torque.

3. The motor control unit according to claim 1, wherein the command current setting unit calculates the correction amount with which the immediately preceding value of the command current is maintained when an absolute value of the torque deviation is equal to or smaller than a predetermined value;

the command current setting unit calculates the correction amount with which the immediately preceding value of the command current is decreased when the absolute value of the torque deviation is larger than the predetermined value and an absolute value of the detected torque is smaller than an absolute value of the command torque; and the command current setting unit calculates the correction amount with which the immediately preceding value of the command current is increased when the absolute value of the torque deviation is larger than the predetermined value and the absolute value of the detected torque is larger than the absolute value of the command torque.

4. The motor control unit according to claim 1, wherein the command current setting unit includes:
   a first control unit that calculates the correction amount on an assumption that the command torque is equal to or higher than 0;
   a second control unit that calculates the correction amount on an assumption that the command torque is lower than 0; and
   a switching unit that selects and outputs the correction amount calculated by the first control unit when the command torque is equal to or higher than 0, ;and that selects and outputs the correction amount calculated by the second control unit when the command torque is lower than 0.

5. The motor control unit according to claim 1, wherein the command current setting unit calculates the correction amount with which the immediately preceding value of the command current is increased when an absolute value of the detected torque is larger than an absolute value of the command torque and an absolute value of the torque deviation is larger than a first predetermined value;

the command current setting unit calculates the correction amount with which the immediately preceding value of the command current is increased when the absolute value of the detected torque is smaller than the absolute value of the command torque and the absolute value of the torque deviation is larger than a second predetermined value, and the command current setting unit calculates the correction amount with which the immediately preceding value of the command current is decreased in each of a case where the absolute value of the detected torque is larger than the absolute value of the command torque and the absolute value of the torque deviation is equal to or smaller than the first predetermined value and a case where the absolute value of the detected torque is smaller than the absolute value of the command torque and the absolute value of the torque deviation is equal to or smaller than the second predetermined value.

6. A vehicle steering system, comprising:

a motor that supplies a driving force to a steering mechanism of a vehicle; and the motor control unit according to claim 1.

* * * * *